(12) United States Patent
Edel et al.

(10) Patent No.: US 11,618,042 B2
(45) Date of Patent: Apr. 4, 2023

(54) DIELECTROPHORETIC TWEEZER

(71) Applicant: Imperial College of Science, Technology and Medicine, London (GB)

(72) Inventors: Joshua Edel, London (GB); Aleksandar Ivanov, London (GB); Binoy Paulose Nadappuram, London (GB); Paolo Cadinu, London (GB)

(73) Assignee: Imperial College Innovations Limited, London (GB)

( * ) Notice: Subject to any disclaimer, the term of this patent is extended or adjusted under 35 U.S.C. 154(b) by 362 days.

(21) Appl. No.: 15/733,019

(22) PCT Filed: Sep. 25, 2018

(86) PCT No.: PCT/GB2018/052724
§ 371 (c)(1),
(2) Date: Mar. 23, 2020

(87) PCT Pub. No.: WO2019/058144
PCT Pub. Date: Mar. 28, 2019

(65) Prior Publication Data
US 2020/0230612 A1 Jul. 23, 2020

(30) Foreign Application Priority Data
Sep. 25, 2017 (GB) .................................. 1715448

(51) Int. Cl.
*B03C 5/00* (2006.01)
*B03C 5/02* (2006.01)
*G01N 27/447* (2006.01)

(52) U.S. Cl.
CPC .............. *B03C 5/005* (2013.01); *B03C 5/026* (2013.01); *G01N 27/44791* (2013.01); *B03C 2201/26* (2013.01)

(58) Field of Classification Search
None
See application file for complete search history.

(56) References Cited

U.S. PATENT DOCUMENTS 8,262,885 B2   9/2012   Hunt et al.
8,365,311 B2   1/2013   Nawarathna et al.
(Continued)

FOREIGN PATENT DOCUMENTS

WO   2016198900 A2   12/2016

OTHER PUBLICATIONS

K. McKelvey, et al., "Fabrication, Characterization, and Functionalization of Dual Carbon Electrodes as Probes for Scanning Electrochemical Microscopy (SECM)", Analytical Chemistry, 85(15): p. 7519-7526 & S1-S10, Aug. 2013.*

(Continued)

*Primary Examiner* — J. Christopher Ball
(74) *Attorney, Agent, or Firm* — Bradley J. Thorson; DeWitt LLP

(57) ABSTRACT

The disclosure relates to a dielectrophoretic tweezer, and associated methods of fabrication and use. The tweezer comprises a first end and a second end, in which the first end has a lateral dimension of less than 10 microns; a structure, extending in a longitudinal direction between the first and second ends, comprising an electrically insulating barrier defining a first chamber and a second chamber within the structure, in which the first and second chambers are insulated from each other by the electrically insulating barrier; a first electrode in the first chamber at the first end; and a second electrode in the second chamber at the first end, in which a width of the electrically insulating barrier separating the first electrode from the second electrode is 50 nm or less.

20 Claims, 24 Drawing Sheets

(56) References Cited

U.S. PATENT DOCUMENTS

2003/0011389 A1    1/2003   Nakayama et al.
2009/0211910 A1    8/2009   Hunt et al.
2016/0032275 A1    2/2016   Actis et al.

OTHER PUBLICATIONS

UK Combined Search and Examination Report, dated Mar. 12, 2018.
Menachery et al., "Dielectrophoretic tweezer for isolating and manipulating target cells", IET Nanobiotechnology, vol. 5, No. 1, 2011, pp. 1-7.
PCT International Search Report and Written Opinion, published Mar. 28, 2019.
Kodama et al., "Smooth-Tip Dielectrophoresis Based Tweesers for Single Liposome Handling", 16th International Conference on Miniaturized Systems for Chemistry and Life Sciences, Oct. 28-Nov. 1, 2012, Okinawa, Japan, pp. 1081-1083.
McKelvey et al., "Fabrication, Characterization, and Functionalization of Dual Carbon Electrodes as Probes for Scanning Electrochemical Microscopy (SECM)", Anal. Chem. 2013, 85, pp. 7519-7526.
Guillaume-Gentil et al., "Tunable Single-Cell Extraction for Molecular Analyses", Cell 2016, 166, pp. 506-516.
Actis et al., "Compartmental Genomics in Living Cells Revealed by Single-Cell Nanobiopsy", ACS Nano, Jan. 28, 2014, vol. 8, No. 1, pp. 546-553.
Nashimoto et al., "Evaluation of mRNA Localization Using Double Barrel Scanning Ion Conductance Microscopy", ACS Nano 2016, 10, pp. 6915-6922.
Nawarathna et al., "Selective Probing of mRNA Expression Levels within a Living Cell", Applied Physics Letters 95, 2009, 95, pp. 083117-1-083117-3.
Nadappuram et al., "Quad-Barrel Multifunctional Electrochemical and Ion Conductance Probe for Voltammetric Analysis and Imaging", Anal Chem. 2015, 87, pp. 3566-3573.
Miles et al. "Single molecule sensing with solid-state nanopores: novel materials, methods, and applications", Chem. Soc. Rev., 2013, 42, pp. 15-28.
Simmons, "Generalized Formula for the Electric Tunnel Effect between Similar Electrodes Separated by a Thin Insulating Film", Journal of Applied Physics, 1963. 34(6), pp. 1793-1803.
Notice of Intention to Grant, text intended for grant and EPO Form 2056 dated Jun. 24, 2022 for corresponding European Application No. 18786017.6, 65 pages.

* cited by examiner f

```
Query    GCTATCAACTATCTGATGCAA
         |||||| |||||||||||||||
Subject  GCTATC_ACTATCTGATGCAA
```

```
TTTGCACACAAGGTATCGGGGAAATACCGTGGT
|||||||||||||||||||||||||||||||||
TTTGCACACAAGGTATCGGGGAAATACCGTGGT

GTGGCAAAGCTTGAAGGAAATACTAAGGCAAAG
|||||||||||||||||||||||||||||||||
GTGGCAAAGCTTGAAGGAAATACTAAGGCAAAG

GTACTGCAAGTGCTCGCAACATTCGCTTATGCG
|||||||||||||||||||||||||||||||||
GTACTGCAAGTGCTCGCAACATTCGCTTATGCG
``` g

DIELECTROPHORETIC TWEEZER

The disclosure relates to dielectrophoretic tweezers, and in particular, although not exclusively, to the fabrication of a nanotweezer, that can be used for dielectrophoretic trapping, in single cell nanobiopsies, and tunneling detection.

Single cell analysis at the molecular resolution is critical in understanding biophysical processes and cellular responses associated with various pathological manifestations such as neurodegenerative disease or cancer, in which little yet crucial details are often masked due to the use of ensemble averaging. To achieve this, a target molecule is extracted from individual cells prior to analysis. Until recently, microfluidic platforms incorporating various single cell manipulation techniques, such as microwell-based docking, electrokinetic single cell focusing and optical tweezer, were widely employed for high-throughput chemical analysis of single cells. Nevertheless, these methods require the removal of the target cell from its natural surroundings and, in most cases, its lysis in regulated environments, leading to post-lysis analyte modifications and the loss of contextual information.

The use of minimally invasive sampling devices based on atomic force microscopy (AFM) tips or micro/nanopipettes at least partially addresses these issues. These techniques have the ability to manipulate individual cells with reduced perturbation of the cells and physiological processes under investigation. Nevertheless, both AFM tip and nanopipette-based extraction strategies involve withdrawal of cytoplasmic fluid from the cells, which if it exceeds a femtoliter volume, could impact the survival of the cell. Also, the very low concentration (<pm) of analyte molecule in the femtoliter volumes poses challenges to subsequent in-vitro analyses.

In general, the disclosure relates to an apparatus, or probe, comprising:
  a first, distal end and a second, proximal end, in which the first end has a lateral dimension, or width, of less than 10 microns;
  a structure, extending in a longitudinal direction between the first and second ends, comprising an electrically insulating barrier defining a first chamber and a second chamber within the structure, in which the first and second chambers are insulated from each other by the electrically insulating barrier;
  a first electrode in the first chamber at the first end; and
  a second electrode in the second chamber at the first end.

According to a first aspect there is provided a dielectrophoretic tweezer comprising:
  a first, distal end and a second, proximal end, in which the first end has a lateral dimension, or width, of less than 10 microns;
  a structure, extending in a longitudinal direction between the first and second ends, comprising an electrically insulating barrier defining a first chamber and a second chamber within the structure, in which the first and second chambers are insulated from each other by the electrically insulating barrier;
  a first electrode in the first chamber at the first end; and
  a second electrode in the second chamber at the first end.

The features below may relate to the apparatus or dielectrophoretic tweezer described above. The first second chambers may extend longitudinally between the first and second ends. The structure may be dual barreled, quad barreled or multi-barreled.

A width of the electrically insulating barrier separating the first electrode from the second electrode (or electrode gap) may be less than one of 1 µm, 50, 40, 30, 20, 10, or 5 nm for single molecule manipulation and nanobiopsy applications. That is, the electrode gap (which may also be referred to as an interelectrode gap) may be defined by the width of the electrically insulating barrier. For tunneling applications, the width of the insulating barrier may be less than 10 nm.

The first electrode may have a lateral dimension of less than 10 µm or one of 50, 40, 30, 20, 10 nm, or less for single molecule manipulation and nanobiopsy applications. The second electrode may have a lateral dimension of less than 10 µm or one of 50, 40, 30, 20, 10 nm, or less for single molecule manipulation and nanobiopsy applications.

The structure may have a lateral dimension of less than 10 µm or one of 50, 40, 30, 20, 10 nm, or less for single molecule manipulation and nanobiopsy applications, at the first end. Dimensions of 40-60 nm have been found to be particularly useful for some cell biopsy applications.

The first and/or second electrodes may comprise conductive carbon. The electrodes may comprise a metallic compound, including but not limited to, gold and platinum. The first and/or second electrodes may be integrally formed with the structure.

The structure may comprise a tubular wall. The electrically insulating barrier may be within the tubular wall. The tubular wall and the electrically insulating barrier may comprise the same material. The tubular wall and the electrically insulating barrier may be formed of a single piece of material, may have a unitary structure or may be monolithic. The electrically insulating barrier may extend longitudinally between the first and second ends within the tubular wall. The electrically insulating barrier may extend laterally from a first portion of the tubular wall to a second portion of the tubular wall. A glass capillary tube may comprise the tubular wall and electrically insulating barrier. The glass may comprise quartz. The barrier may extend across an interior of the tubular wall in a lateral direction, for example, from one side of the tubular wall to an opposing side of the tubular wall.

The first electrode and second electrode may each define a semi-elliptical surface at the first end. The first electrode and second electrode may have coplanar surfaces at the first end. The first electrode and second electrode may each have a non-coterminous edge region at the first end and a coterminous edge region at the first end. One of the electrodes may be defined by an area that is not entirely surrounded by the other electrode. The first electrode may be non-coaxial with the second electrode.

A metal or metallic layer may extend partially across the electrically insulating barrier to decrease the insulating gap distance. The tweezer or apparatus may comprise a metallic layer on a portion of the electrically insulating barrier at the first end. The metallic layer may comprise a first portion that extends at least partially over the first electrode. The metallic layer may comprise a second portion that extends at least partially over the second electrode. The metallic layer may comprise an electrically insulating gap between the first and second portions. The electrically insulating gap may have a width that is narrower than a width of the electrically insulating barrier. The metallic layer may be formed of a different material to the first and second electrodes. The metallic layer may comprise metal nanoparticles. The electrically insulating gap may have a width of 10 nm or less.

The first end of the structure may be closed or blocked. The first electrode may block fluid flow through the first chamber. The second electrode may block fluid flow through the second chamber.

The dielectrophoretic tweezer or apparatus may comprise an opening in the first chamber at the second end of the structure. The dielectrophoretic tweezer or apparatus may comprise an opening in the second chamber at the second end of the structure. The dielectrophoretic tweezer or apparatus may comprise an electrical contact from the first electrode that passes through the opening in the first chamber at the second end. The dielectrophoretic tweezer or apparatus may comprise an electrical contact from the second electrode that passes through the opening in the first chamber at the second end.

The structure may contain one or more additional chambers. The one or more additional chambers may each be defined by the electrically insulating barrier and structure and may be isolated from other chambers by the electrically insulating barrier.

The structure may comprise one or more open chambers that each have an opening at each of the first and second ends, and provide a channel between the first end and the second end. The one or more open chambers may be insulated and isolated from other chambers within the structure by the electrically insulating barrier.

The structure may comprise a third chamber. The third chamber may have openings at the first and second ends of the structure. The third chamber may provide a channel between the first end and the second end. The third chamber may be defined by the structure and may be insulated and isolated from other chambers within the structure by the electrically insulating barrier. The third electrode may be provided within the third chamber. The third electrode may or may not entirely block fluid flow within the third chamber.

The structure may comprise a fourth chamber. The fourth chamber may have openings at the first and second ends of the structure. The fourth chamber may provide a channel between the first end and the second end. The fourth chamber may be defined by the electrically insulating barrier and the structure and may be insulated and isolated from other chambers within the structure by the electrically insulating barrier. A fourth electrode may be provided within the fourth chamber. The fourth electrode may or may not entirely block fluid flow within the third chamber.

The third chamber may be diagonally opposite to the fourth chamber. The first chamber may be diagonally opposite from the second chamber. The third chamber may neighbour the first chamber and the second chamber. The fourth chamber may neighbour the first chamber and the second chamber.

The structure may be composed of four chambers that are isolated and insulated from each other. Two diagonally opposite chambers of the four chambers may have openings at respective first and second ends and may each provide a channel between the first end and second end. Another two diagonally opposite chambers of the four chambers may each have carbon deposited inside the first end to form two carbon electrodes separated by an insulating barrier with a width of 50 nm or less.

The disclosure also relates to a device comprising:
the dielectrophoretic tweezer; and
a signal generator configured to provide a time-varying voltage to the first and second electrodes of the dielectrophoretic tweezer.

According to a further aspect there is provided a cell biopsy apparatus comprising:
a microscope having a stage for holding a sample;
an actuator configured to actuate movement of a dielectrophoretic tweezer with respect to the stage; and
a signal generator configured to provide a time-varying voltage to the first and second electrodes of the dielectrophoretic tweezer.

The cell biopsy apparatus may comprise the dielectrophoretic tweezer. The actuator may be a micromanipulator The microscope may comprise a scanning probe microscope, such as scanning ion-conductance microscope, for example. The scanning ion-conductance microscope may comprise a holder for holding the dielectrophoretic tweezer. The scanning ion-conductance microscope may comprise a scanning ion-conductance microscopy monitoring circuit having terminals configured to measure a current between the third electrode of the dielectrophoretic tweezer and another electrode. The scanning ion-conductance microscope may comprise a signal generator configured to provide a time-varying voltage to the first and second electrodes of the dielectrophoretic tweezer. The scanning ion-conductance microscope may comprise a controller configured to operate the scanning ion-conductance microscopy monitoring circuit during a different time period to the signal generator. The scanning ion-conductance microscope may comprise the dielectrophoretic tweezer. The other electrode may be an electrode that is connected to the same or the fourth electrode of the dielectrophoretic tweezer.

According to a further aspect there is provided a method of forming a dielectrophoretic tweezer or apparatus, the method comprising:
receiving a structure comprising a first end, a second end and an electrically insulating barrier, in which a first chamber and a second chamber are defined within the structure and are insulated from each other by the electrically insulating barrier;
pulling the structure to form a lateral dimension of less than 10 microns at the first end of the structure;
depositing a conductive material to form a first electrode in the first chamber by at the first end of the structure; and
depositing a conductive material to form a second electrode in the second chamber by depositing a conductive material at the first end of the structure.

A layer of metal may be electrodeposited onto the first and second electrodes and electrically insulating barrier to create an electrically insulating gap that is narrower than a width of the electrically insulating barrier. The method may comprise depositing a metallic layer onto the electrically insulating barrier and one or more of the first and second electrodes to create an electrically insulating gap that is narrower than a width of the electrically insulating barrier. The method may comprise electrodepositing the material onto the first and second electrodes. The structure may comprise a third chamber and a fourth chamber. The third chamber may be diagonally opposite to the fourth chamber. The first chamber may be diagonally opposite from the second chamber. The third chamber may neighbour the first chamber and the second chamber. The fourth chamber may neighbour the first chamber and the second chamber.

An electrical contact to the first and second electrodes may be realised by inserting a metal wire through the second end until it contacts the carbon layer at the first end.

The method may comprise monitoring a current between the electrodes during electrodeposition. The method may comprise halting or suspending deposition in response to the current, or a rate of the change of current, reaching a threshold level. The layer of metal or metallic layer may comprise metal nanoparticles. The electrically insulating gap has a width of 10 nm or less.

The structure may be pulled to form a lateral dimension of one of 1000, 500, 200, 100, 60, 50, 40 nm, or less, at the first end of the structure. Pulling may be performed by a laser puller.

The conductive material may comprise carbon. The carbon may be deposited pyrolytically by combusting a substance within the structure. The electrodeposited layer of metal may include gold or platinum.

According to a further aspect there is provided a method of operating a dielectrophoretic tweezer, the method comprising:
bringing the first end of the dielectrophoretic tweezer into the proximity of a molecule of interest;
applying time-varying voltage across the first and second electrodes of the dielectrophoretic tweezer to create an dielectrophoretic field at the first end of the dielectrophoretic tweezer;
attracting the molecule of interest to the first and second electrodes using the dielectrophoretic field; and
releasing the molecule of interest. The molecule may be released by applying a varying voltage across the first and second electrodes to generate a repulsive field for the molecule of interest.

The method may have applications, for example, in single biomolecule manipulation, selective extraction (biopsy) of nucleic acids (RNA and DNA) from the cytoplasm and nucleus, and in single organelle manipulation or transplantation.

The dielectrophoretic tweezer may have a structure as described above. The method may comprise applying a direct current bias between the first and second electrodes and monitoring the tunneling current for structural identification of the trapped molecule. Two open chambers of the structure may be used to translate, or translocate, one or more molecule from one chamber to another while using the electrodes in the other two chambers to simultaneously characterize the molecules.

The method may be used to extract the molecule of interest from a fluid, such as a serum, cerebral spinal fluid or tissue extract, for example. A single molecule may be extracted, manipulated or transplanted. The molecule of interest may be an analyte or a nucleic acid.

The method may comprise inserting the first end of the dielectrophoretic tweezer into a cell. The molecule of interest may be within a cell when the first end of the dielectrophoretic tweezer is brought into its proximity. The method may comprise extracting the molecule of interest from the cell. The molecule of interest may be an analyte. The method may comprise analysing the analyte using qPCR profiling, sequence or fluorescence imaging.

The method may comprise releasing the molecule of interest into the cell.

The method may be used to extract the molecule of interest from a fluid or a cell, followed by collection of the extracted molecules in one or more hollow chambers. The collection may be done by applying pressure or suction, or electric fields across the hollow chambers. The structure may comprise an open chamber that has an opening at each of the first and second ends, and provide a channel between the first end and the second end. The open chamber may be insulated and isolated from other chambers within the structure by the electrically insulating barrier. The method may comprise collecting the molecule of interest in one of the open chamber. The method may comprise applying one or more of (i) pressure or suction; or (ii) an electric field across the open chamber, in order to collect the molecule of interest. The open chamber may be hollow.

The method may comprise inspecting the position of the first end of the dielectrophoretic tweezer with respect to the cell using an optical or other microscope.

The module of interest may be released by turning off the time-varying voltage across the first and second electrodes or by applying a voltage across the first and second electrodes to generate a repulsive field for the molecule of interest.

The method may also be used for the identification and structural characterization of the molecule of interest from a fluid, such as a serum, cerebral spinal fluid or tissue extract, for example. The molecule of interest may be an analyte or a nucleic acid.

The method may comprise inserting the first end of the dielectrophoretic tweezer into a fluid. The method may comprise applying an alternating electric field between the electrodes in the dielectrophoretic tweezer for pre-concentrating the molecule of interest. The method may comprise applying a bias between the electrodes and monitoring the tunneling current.

The structure may comprise a third chamber. The third chamber may have an opening at each of the first and second ends, and may provide a channel between the first end and the second end. The third chamber may be insulated and isolated from other chambers within the structure by the electrically insulating barrier. A third electrode may be provided within the third chamber. The method may comprise scanning the dielectrophoretic tweezer over the cell. The method may comprise measuring a current between the third electrode of the dielectrophoretic tweezer and another electrode to obtain ion-conductance microscopy measurements during the scanning during the scanning as a feedback signal to control the position of the dielectrophoretic tweezer.

The structure may comprise a fourth chamber. The fourth chamber may have an opening at each of the first and second ends, and may provide a channel between the first end and the second end. The fourth chamber may be insulated and isolated from other chambers within the structure by the electrically insulating barrier. Said another electrode may be a fourth electrode provided in the fourth chamber.

Materials including nucleic acids or proteins may be introduced to the first end of the dielectrophoretic tweezer, from the second end of the dielectrophoretic tweezer via a fourth chamber that provides a fluid passage channel from the second end to the first end.

An electrically insulating gap with a width of 10 nm or less may separate the electrodes or metallic layers on the respective electrodes. The method may comprise applying a direct current bias between the first and second electrodes. The method may comprise monitoring a tunneling current between the first and second electrodes. The method may comprise characterizing an analyte, such as DNA or RNA, based on the tunneling current.

One or more embodiments of the disclosure will now be described, by way of example only, and with reference to the accompanying figures in which:

FIG. 11b illustrates a cross-section taken through the tweezer of FIG. 11a;

Figure 1:
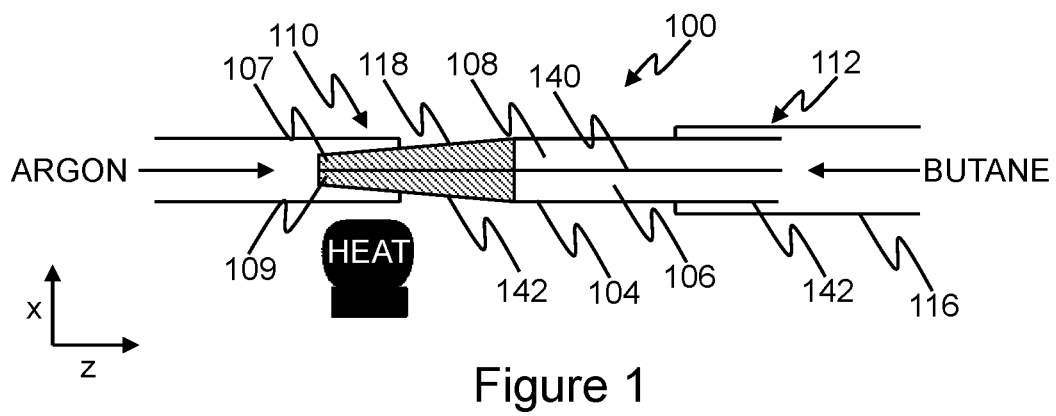
FIG. 1 illustrates a schematic of fabrication of a nanotweezer.

The operation of a tweezer (or nanotweezer) differs from the operation of a pipette (or nanopipette) in that a tweezer is configured to hold an object in place at its distal end, whereas a pipette is configured to draw a fluid medium comprising an object into an internal reservoir of the pipette. The use of a nanotweezer instead of a nanopipette therefore addresses the problems associated with the removal of cytoplasmic fluid from cells under analysis.

A nanotweezer is an apparatus with a nano-metric length-scale cross-section portion that provides a tweezer action, in that it enables an object to be picked up and placed down using a distal end of the apparatus. The present disclosure relates to a dielectrophoretic (DEP) nanotweezer, which has a pair of electrodes to apply a holding force using DEP, rather than a pair of gripping members as is the case with mechanical tweezers. Such a DEP nanotweezer can provide a minimally invasive or passive-invasive single cell sampling technique for concentrating and extracting cellular components while maintain cellular integrity and allowing precise manipulation of molecules in individual cells.

DEP-based methods can apply forces to biomolecules of interest (i.e. DNA, RNA proteins) to concentrate them using an inhomogeneous electric field. In the case of DNA, a non-uniform electric field acts on induced dipole moments to attract the molecule towards the point of maximum electric field gradient ($\nabla |E|^2$). Examples of the nanotweezer have been found to be capable of producing a high dielectrophoretic field gradient, of the order of $|\nabla |E|^2|=1\times 10^{28}$ V$^2$ m$^{-3}$ while resulting in limited temperature increases in the specimen. In simulated results, the temperature of the electrode is order of 303K compared with standard temperature surroundings. That is, the temperature of the electrodes is not substantially elevated during dielectrophoresis. Inadvertent damage to cells under analysis may therefore be reduced or limited in comparison to techniques where a substantial increase in temperature occurs during probing. When modelling the temperature increase of the surrounding medium, it was found that a low conductively solution (1 mM KCl) shows no increase in temperature. A simulated sample indicative of the conductivity of an organic cell showed a 12 K increase at the electrode, which falls exponentially as a function of difference to an increase of only about 2 K at a distance of 200 nm from the electrode.

Dielectrophoresis (DEP) can be employed within a fluidic system to enhance the transport of molecules, increase the concentration of molecular species, perform separation processes, as well as stretch and immobilize molecules. The apparatus described herein may utilize the polarizability of an analyte to apply forces to the molecule and manipulate its position.

In some examples, the dielectrophoretic tweezer comprises:

a first, distal end and a second, proximal end, in which the first end has a lateral dimension of less than 10 microns;

a structure, extending in a longitudinal direction between the first and second ends; comprising an electrically insulating barrier defining a first chamber and a second chamber extending longitudinally between the first and second ends within the tubular wall, in which the first and second chambers are insulated from each other by the electrically insulating barrier;

a first electrode in the first chamber at the first end; and a second electrode in the second chamber at the first end.

The tweezer may be considered to be a nanotweezer because it is used to extract analyte of nanoscale dimensions. Such a nanotweezer is composed of two individually addressable nanoelectrodes separated by a nanoscale septum, which acts as an electrically insulating barrier. Such a structure may be used to generate a relatively high dielectrophoretic field required for the trapping and extraction of various molecules. Advantages of the nanotweezer, according to some implementations, include:

used with a simple optical microscope and micromanipulator, therefore enabling nanobiopsy without the need for sophisticated instrumentation.

easy fabrication: time <5 min, cost <£1 enable molecules, or a single molecule, to be extracted based on polarizability: selective extraction keeps cell viable because cell fluid is not withdrawn the small foot print of the tip (within <100 nm and may ca. 60 nm) avoids cell damage/membrane rupture it can be combined with fluorescence or other optical methods it can be used to perform tunneling detection it can be coupled to nanopore sensing An inexpensive and easy-to-perform fabrication technique for a dielectrophoretic (DEP) nanotweezer is described below with reference to FIG. 1. Properties of the nanotweezer are discussed in relation to FIGS. 2 and 3. The use of the nanotweezer for non-destructive sub cellular concentration (trapping) and extraction of biomolecules is discussed in relation to FIGS. 4 and 5. The capability of these nanotweezers for passive-invasive single cell extraction of a single molecule or molecules under physiological environment was demonstrated by using them for extracting genomic DNA and RNA from human osteosarcoma (U2OS) cells for genomic analysis, and is characterization of the extracted products is discussed below with reference to FIGS. 6 to 10. A modified nanotweezer for use in a scanning ion conductance microscope is described with reference to FIG. 11.

The nanotweezer described herein may be fabricated from quartz capillaries by a two-step process, such as quartz theta capillaries. FIG. 1 illustrates a dielectrophoretic nanotweezer 100 formed immediately after the two-step process is complete.

In a first step, a dual barreled quartz theta capillary (outer diameter 1.2 mm, inner diameter 0.90 mm, supplied by Friedrich & Dimmock, Inc) is pulled into a sharp pointed tubular structure 104 using a laser puller (P-2000, supplied by Sutter Instruments). The sharp point has a lateral dimension (x), or thickness, of less than 1 micron. However, the lateral dimension (x) obtained using the laser puller may be substantially smaller, such as less than 100, 60, 50 or 40 nm, for example. This may be achieved using a custom two-line program:

HEAT-925, FILAMENT-4, VELOCITY-40, DELAY-130, PULL-40;
HEAT-875, FILAMENT-4, VELOCITY-60, DELAY-126, PULL-35.

The tubular structure 104 is double barreled, or dual barreled, meaning that it defines a first chamber, which may also be referred to as a first cavity 106, and a second chamber, which may also be referred to as a second cavity 108. In general, a chamber may also be referred to as a cavity or nanopore. The first cavity 106 is separated from the second cavity 108 by a septum 140 that prevents fluid flow within the tubular structure 104 between the first cavity 106 and the second cavity 108. The first cavity 106, second cavity 108 and septum 140 are all contained within the tubular structure 104 by a tubular wall 142 of the tubular structure 104. The tubular structure 104 has a first end, which may also be referred to as a distal end 110, that is adjacent to the point, nib or tip of the tubular structure 104. The tubular structure 104 has a second end, which may also be referred to as a proximal end 112 at the other extremity of the cavities 108, 112 from the distal end 110. The tubular structure 104 extends in a longitudinal direction (z) between the proximal and distal ends.

In a second step, electrodes 107, 109 are formed in the tubular structure 104. The size of the electrodes 107, 109 and the thickness of the septum 140 and a tubular wall 142 of the tubular structure 104 are dependent on the laser pulling parameters employed and can be varied by changing the laser pulling parameters during fabrication. Tubing 116, which may be provided by a rubber tube, is secured around the proximal end 112 of the tubular structure 104. A regulated flow of butane, or other combustible gas, is passed from the tubing 116, through the proximal end 112 of the tubular structure 104, through the first and second cavities 106, 108 of the tubular structure 104, and subsequently out of the distal end 110 of the tubular structure 104. An argon atmosphere is provided at the distal end 110 of the tubular structure 104 via a quartz theta capillary 102. The tip at the distal end 110 of the tubular structure 104 is heated using, for example, a butane torch. The heating is typically performed for 35 s, to pyrolytically deposit carbon 118 from the butane within the first and second cavities 106, 108 at the distal end 110 of the tubular structure 104. The carbon 118 provides first and second electrodes 107, 109 at the tip of the tubular structure 104. The first electrode 107 is in the first cavity 106 and the second electrode 109 is in the second cavity 108. The first and second electrodes 107, 109 block the respective first and second cavities 106, 108 so that the tubular structure 104 is closed at the distal end 110. The septum 140 provides an electrically insulating barrier that extends longitudinally between the ends of the tubular structure 104 and extends laterally from a first portion of the tubular wall 142 to a second portion of the tubular wall 142. In this way, the septum 140 provides an insulating barrier that separates, or isolates, the first electrode 107 from the second electrode 109.

Electrical contacts to the carbon electrodes 107, 109 may be established by inserting copper wires through the proximal end 112 of the tubular structure to make contact with the carbon deposits.

In this way, a nanotweezer can be fabricated easily and inexpensively, without the requirement to use complex and expensive instrumentation such as those used in some material deposition techniques.

Particular difficulties are experienced when attempting trap and concentrate sub-cellular components such as such as DNA, RNA or proteins which poses high thermal force due to Brownian movement, a dielectrophoretic tweezer capable of creating a sufficiently large dielectrophoretic force (in the order of fN) is required. This can be accomplished either by increasing the voltage between the electrodes or by reducing the distance between electrodes. Increasing applied voltage could lead to unwanted heat generation, bubble formation, and electrochemical reactions and hence is not desirable for manipulating biomolecules. On the other hand, shrinking the separation between two electrodes in the nanotweezer can significantly increase the force at a given bias voltage due to the cubic function relationship between the interelectrode spacing and the field gradient.

Figure 2A:
FIGS. 2a and 2b show micrographs of a nanotweezer formed using the laser pulling fabrication method.
Figure 2B:
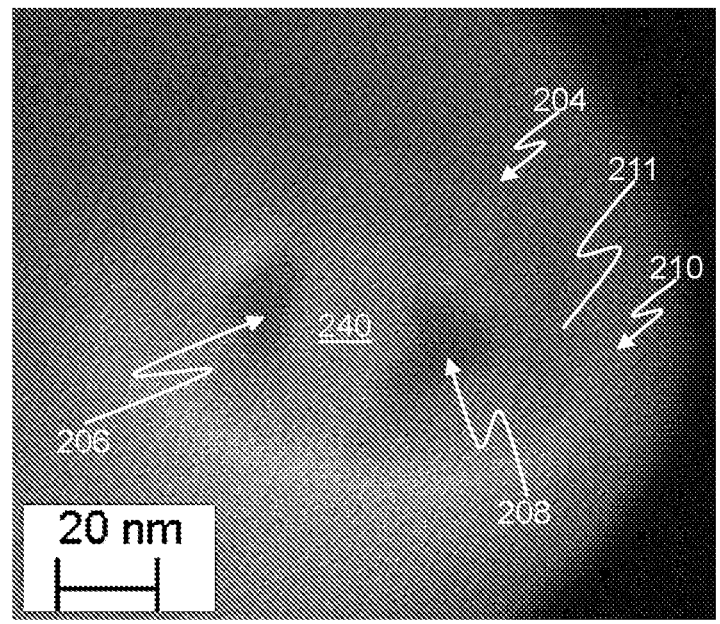

FIGS. 2a and 2b illustrate micrographs characterizing the structure formed in the first step of the fabrication process described with reference to FIG. 7 (before carbon deposition). In FIG. 2a, a longitudinal view of the pipette 204 is shown. The pipette has an axial length greater than 100 μm. FIG. 2b illustrates an axial view of a cross section of the distal end 210 of the pipette 204. The pipette 204 has a first cavity 206 and a second cavity 208. The first cavity 206 is separated from the second cavity 208 by a barrier 240. The barrier 240 is formed of the same material as an external wall 211 of the pipette 204. In the example shown, the first cavity 206 has a width of approximately 20 nm and the second cavity 208 has a width of approximately 40 nm. In other examples, the first cavity 206 may have a similar width to the second cavity 208.

The interelectrode separation provided by the barrier 240 is approximately 20 nm in this example. An electrode separation of 5-20 nm enables the generation of large localized dielectrophoretic field required for nanobiopsy, which may not be easily achieved with larger separations, such as over 50 nm, for example, without needing to apply a high AC voltage. Reducing the applied voltage may avoid excessive heating at the tip, and so avoid damaging the cell. The capability of the fabrication process described with reference to FIG. 1 to prepare structures with a very small electrode separation therefore enables the inexpensive and relatively straightforward provision of a dielectrophoretic nanotweezer with improved performance compared to that provided by some conventional fabrication techniques. The electrode gap distance, or separation, is a more important parameter than the size or area of the electrodes, which may be relatively large in comparison to the interelectrode separation.

FIGS. 3A to 3F illustrate six schematic views of example end-of-tweezer configurations, which may be formed using the method described previously with reference to FIG. 1.

In each case, a distal end of the tweezer is viewed in cross-section in a lateral plane (x-y), along a longitudinal direction (z). The distal end typically has a cross-sectional dimension 302, or diameter, of less than 10,000 nanometres. The cross-sectional dimension 302 may be between 40 and 60 nanometres, which is particularly advantageous for applications of the dielectrophoretic tweezers for use in cell biopsy applications as discussed above in relation to FIG. 2.

The tweezers in FIGS. 3A to 3F each comprise a structure with a tubular wall 342 and an electrically insulating barrier 340a-f separating a first electrode 307a-d from a second electrode 309a-d. The electrically insulating barrier 340a-f provides an interelectrode separation distance 342, which may be less than 1000 nanometres. In some examples, the interelectrode separation distance 342 is between 5-20 nanometres, which relates to a dimension range which can be achieved using the fabrication method described previously with reference to FIG. 1 and enables dielectrophoresis to be performed using a relative low applied voltage.

Various different arrangements for the electrically insulating barrier 340a-d are illustrated in FIGS. 3A-3F. The electrically insulating barrier may be formed from the same material as the tubular wall 342 of the structure, and may be provided by glass, for example. That is, the tubular wall and the electrically insulating barrier may be formed of a single piece of material, have unitary structure or be monolithic.

In the examples of FIGS. 3A-3D, the electrically insulating barrier 340 extends within the tubular structure from one portion of the tubular wall 342 to another portion of the tubular wall 342. The electrically insulating barrier 340a-d defines the first electrode and the second electrode, each having a non-coterminous edge and a coterminous edge. That is, in each example, one of the first and second electrodes 307a-d, 309a-d is not defined by an area that is entirely surrounded by the other of the first and second electrodes 307a-d, 309a-d. The first and second electrodes 307a-d, 309a-d are not co-axial along the longitudinal direction (z).

Figure 3A:
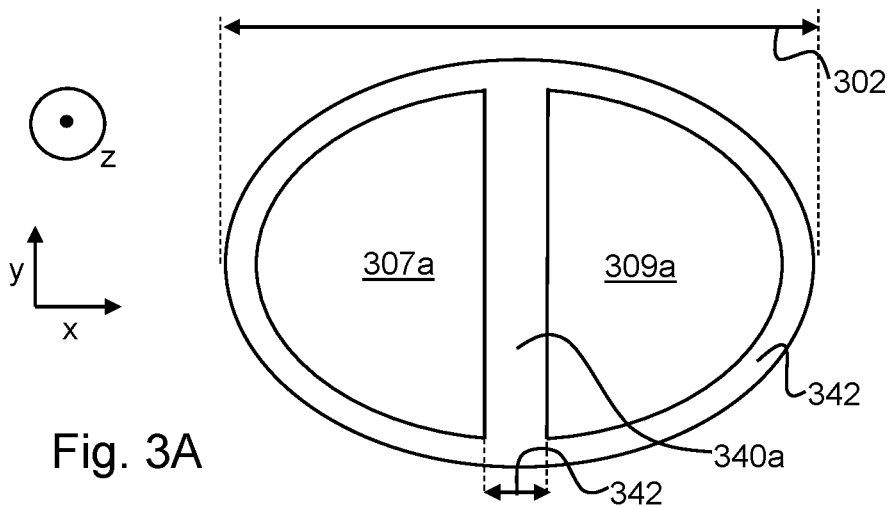
FIGS. 3A to 3F illustrate six schematic views of example end-of-tweezer configurations.

In FIG. 3A, the electrically insulating barrier 340a extends across the interior of the tubular structure from one side of the tubular structure to an opposing side of the tubular structure and defines semi-elliptically shaped first and second electrodes 307a-c, 309a-c of approximately equal area.

Figure 3B:
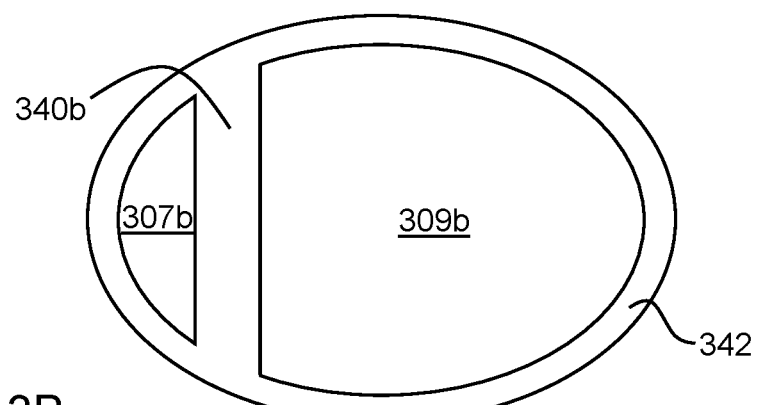
Figure 3C:
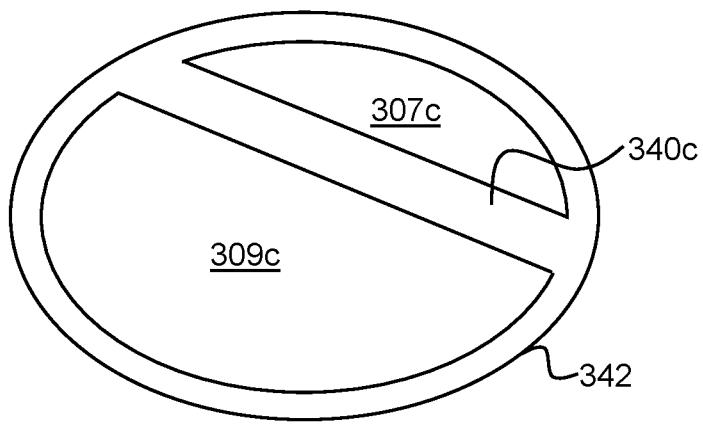
Figure 3D:
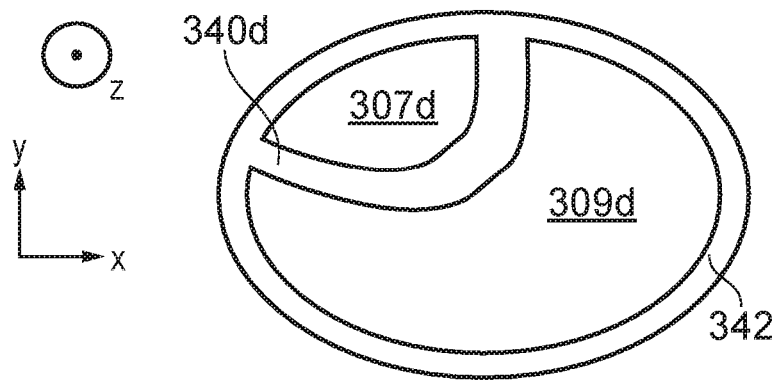

In the examples illustrated in FIGS. 3B and 3C, the area of one of the electrodes (the second electrode 309b, 309c) is substantially greater than an area of the other electrode (the first electrode 307b, 307c).

In the example illustrated in FIG. 3C, the electrically insulating barrier 340c extends in a transverse direction across the interior of the tubular structure.

In FIGS. 3A to 3C, the electrically insulating barrier 340a-c is provided by a planar member. In the example illustrated in FIG. 3D, the electrically insulating structure 330d is non-planar. In an unrelated feature of FIG. 3d, the electrically insulating barrier 340d returns to the same side of the tubular wall 342 of the tubular structure from which it extends.

Figure 3E:
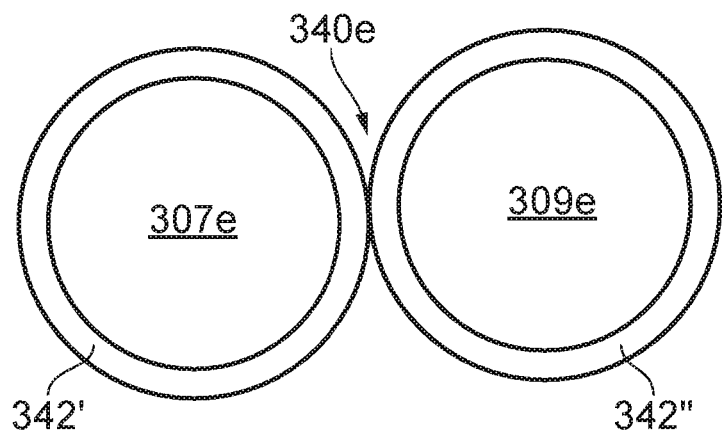

In FIG. 3E, the structure comprises a first tubular wall 342' and a second tubular wall 342". The first electrode 307e is defined within the first tubular wall 342' and the second electrode 309e is defined within the second tubular wall 342". The first tubular wall 342' is directly connected to the second tubular wall 342". An electrically insulating barrier 340e is formed by the first and second tubular walls 342', 342" at a point at which they are connected.

Figure 3F:
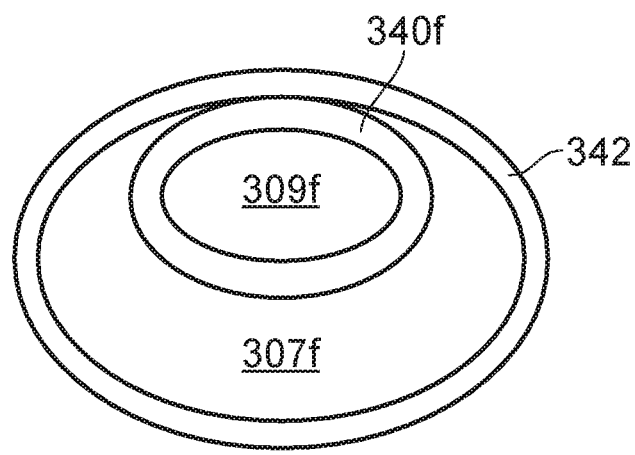

In FIG. 3F, the electrically insulating barrier 340f is provided by a tubular wall within the outer tubular wall 342. The electrically insulating barrier 340f laterally surrounds the second electrode 309. In this example the electrically insulating barrier 340f is directly connected to the tubular wall 342, as is the case in the examples FIGS. 3A to 3D.

Figure 4:
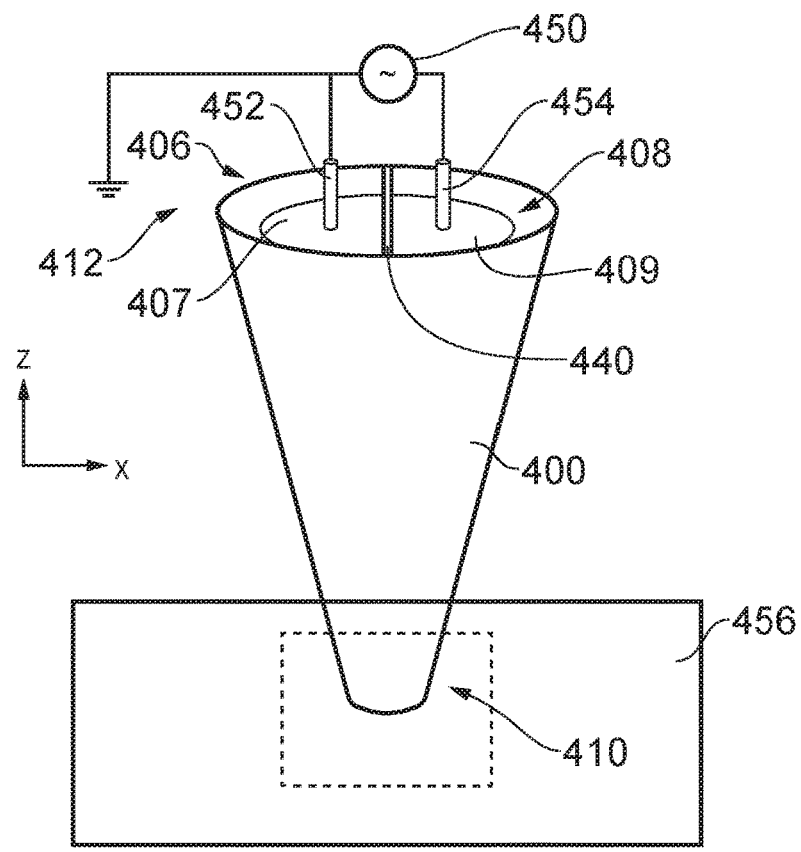
FIG. 4 illustrates a schematic view of an apparatus comprising a nanotweezer.
Figure 5:
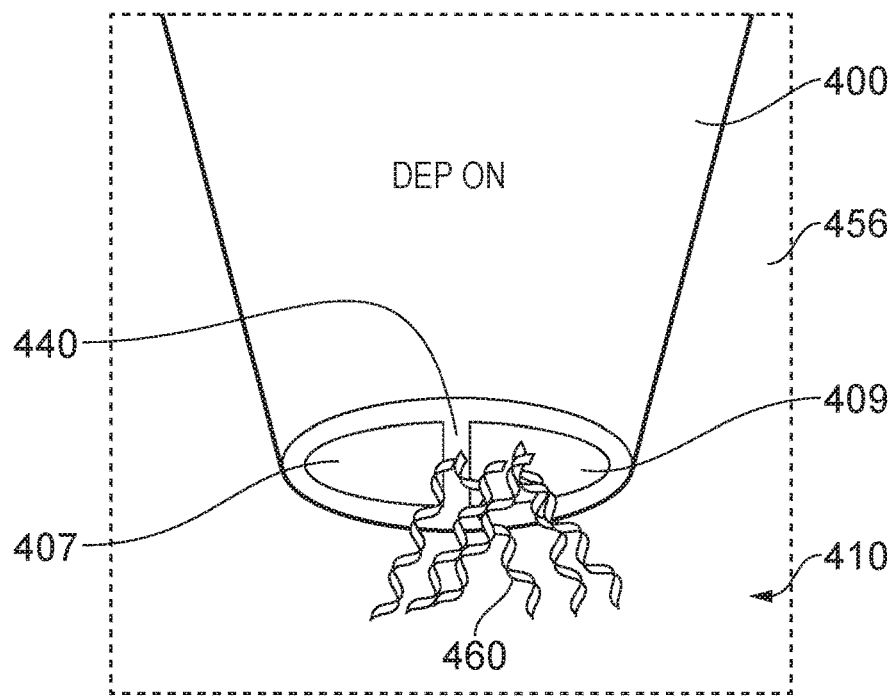
FIG. 5 illustrates a further schematic view of a tip of the nanotweezer of FIG. 4.

FIG. 4 illustrates a schematic view of a dielectrophoretic nanotweezer, such as those described previously with reference to FIGS. 1 to 3 in use. FIG. 5 illustrates an exploded view (at a different angle) of the distal end of the dielectrophoretic nanotweezer of FIG. 4. The same series of reference numerals are used between FIGS. 4 and 5.

The dielectrophoretic nanotweezer 400 comprises a first electrode 407 defined within a first cavity 406 and a second electrode 409 defined within a second cavity 408. The first cavity 406 is separated from, and electrically insulated from, the second cavity 408 by an electrically insulating barrier 440, or septum. External electrical connections to the first and second electrodes 407, 409 are provided at a proximal end 412 of the nanotweezer 400. A first electrical connection 452 is made between the first electrode 407 and a signal generator 450. A second electrical connection 454 is made between the second electrode 409 and the signal generator 450. In this example, the first electrode 407 is connected to ground. In this way, the signal generator 450 is configured to apply a time-varying voltage across the first and second electrodes 407, 409.

A time-varying voltage is a voltage that varies substantially as a function of time. An alternating current (AC) voltage or alternating voltage are examples of time-varying voltages, as is an AC voltage with a DC voltage offset. A time-varying voltage does not necessarily need to change sign. That is, it need not necessarily change from being a positive voltage to a negative voltage and vice versa. The time-varying voltage may have a sinusoid wave function or other wave function such as a triangular or square wave function. The time-varying voltage may also be symmetrical or asymmetrical. The time-varying voltage may also be periodic or aperiodic, regular or irregular.

In this example, the nanotweezer 400 has a distal end 410 that is inserted into a fluid 456 comprising molecules 460 of interest. Under the application of the time-varying voltage between the first electrode 407 and the second electrode 409 by the signal generator 450, a dielectrophoretic attraction and trapping of the molecules 460 takes place. An application of this effect within the context of single cell biopsy apparatus is described below with reference to FIGS. 6A-6D.

Figure 6A:
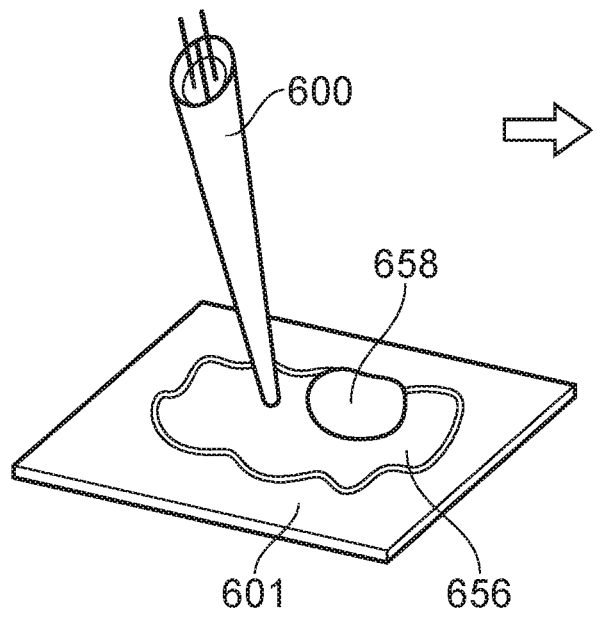
FIGS. 6A to 6D illustrate schematic views of steps in a method for operating a nanotweezer.
Figure 6B:
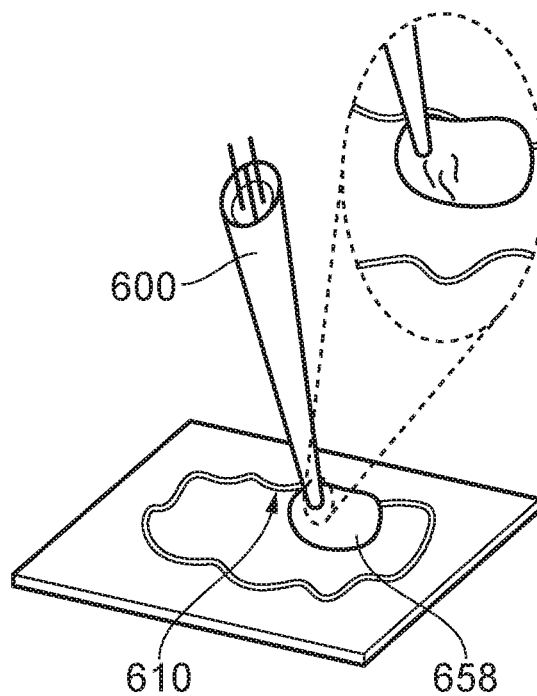

FIG. 6A illustrates material 656 that contains a cell 658 of interest provided on a microscope stage 601. A dielectrophoretic nanotweezer 600 is situated adjacent to the material 656, above the stage 601. The nanotweezer 600 is connected to a micromanipulator (not shown), which may be used to control fine scale movement of the nanotweezer 600 in order to bring the nanotweezer into contact with the material 656. The position of the nanotweezer 600 with respect to the material 656 on the stage 601 may be monitored using optical microscopy, for example.

Figure 6C:
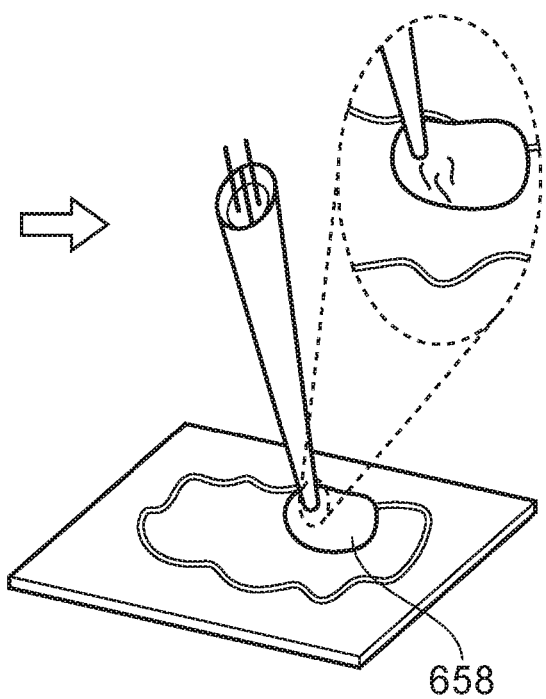

Using the micromanipulator, the distal end 610 of the nanotweezer 600 is inserted into the cell 658. Following insertion, a dielectrophoretic field is generated at the tip of the nanotweezer and the distal end 610 by applying an alternating current (for example 20 $v_{p/p}$ with a frequency of 500 KHz) between electrodes of the nanotweezer using a function generator. The dielectrophoretic field that is created at the distal end 610 traps and concentrates DNA/RNA molecules from the cell around the distal end 610 of the nanotweezer 600. The trapping of molecules is also illustrated in FIG. 6C.

Figure 6D:
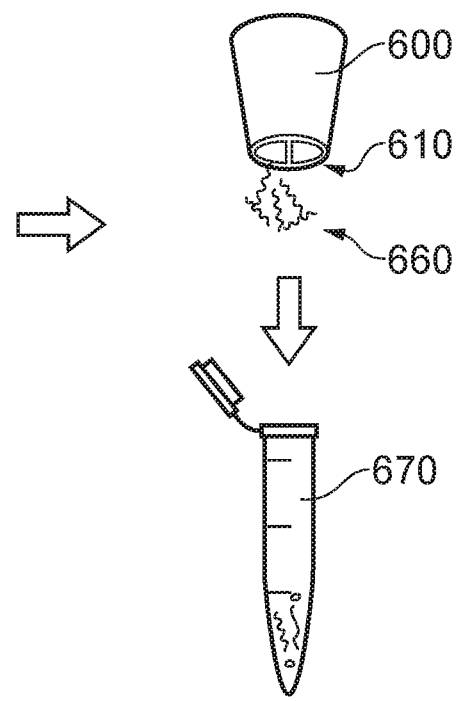

After the nanotweezer 600 has been held inside the cell 658 for a holding time (typically 10-30 seconds), the distal end 610 of the nanotweezer 600 is gradually retracted from the cell into the surrounding air through the material 656. The alternating current remains applied to the nanotweezer 600 during the retraction. The distal end 610 of the nanotweezer 600 is brought over an opening of a sealable reservoir 670, as illustrated in FIG. 6D. Once the distal end 610 of the nanotweezer 600 is in place over the reservoir 670, the alternating current is switched off, to release the extracted DNA/RNA molecules 660 from the nanotweezer, into the reservoir 670.

In addition, or alternatively to the method described with reference to FIGS. 5A to 5D, a molecule of interest may be released into a cell using the tweezer. The molecule of interested may be a nucleic acid or analyte for affecting the operation of the cell.

Although the method described with reference to FIGS. 5A to 5D is described in relation to extracting one or more molecules from a single cell, the method is also generally applicable to trapping molecules from, or releasing molecules in, other fluids, such as a serum, cerebral spinal fluid, tissue extract, for example. The method may have applications in, for example, single biomolecule manipulation, selective extraction (biopsy) of nucleic acids (RNA and DNA) from the cytoplasm and nucleus, and in single organelle manipulation.

FIGS. 7 to 10 illustrate various aspects of characterization of products extracted during a single-cell nanobiopsy using a nanotweezer as described above.

To perform the characterisation, a nanotweezer was mounted on a micromanipulator (PatchStar, Scientifica) perpendicular to a chambered coverglass containing human osteosarcoma (U2OS) cells (obtained from London Research Institute, Cancer Research UK) fixed onto an optical microscope (ix71, Olympus) stage. The microscope was, in turn, mounted on a vibration isolation table (RS 2000, Newport). Images and video were acquired by using a 60× water-immersion objective (1.20 NA, UPLSAPO 60XW, UIS2, Olympus) in conjunction with an electron multiplying CCD camera (Cascade II, Photometrics) while illuminating with a 488 nm continuous-wave solid-state laser (Sapphire 488LP, Coherent).

To extract DNA and RNA from the cells, the U2OS cells were seeded on to a chambered coverglass containing DMEM growth medium with 10% fetal bovine serum for 6-24 h before the media was replaced with fresh growth media. The chambered coverglass containing cells was then mounted onto the microscope stage. DNA/RNA extraction was performed using the method described previously with reference to FIG. 6. The extracted DNA/RNA on nanotweezer tip was then transferred into a qPCR tube for further analysis by inserting the nanotweezer to the tube containing 5 μl of 10 mM Tris HCl (pH 8.5) and breaking the very end of the nanotweezer inside the solution. For DNA, further analysis includes quantitative real-time PCR amplification of target sequences in the extracted DNA and their sequencing whilst for RNA this includes reverse transcription of the RNA followed by preamplification and quantitative real-time PCR amplification to quantify the expression of target genes.

To visualize the extraction of DNA and RNA from the cells, the U2OS cells were first stained by using a triangulenium and SYTO™ RNASelect™ dye respectively. For this, the cells were seeded onto a chambered coverglass containing DMEM growth medium with 10% fetal bovine serum for 6-24 h before the media was replaced with fresh media containing the dye for the specified period of time and concentration (5-20 μM, 4-24 h, 200 μl). Before imaging, the cells were washed with PBS and the incubation medium was replaced with fresh growth media. The chambered coverglass containing stained cells was then mounted onto the microscope stage. The nanotweezer was then inserted into the cell and extraction was initiated by turning on the dielectrophoretic field, which was visualized using fluorescence microscopy as an increase in fluorescence around the nanotweezer tip. After holding the nanotweezer inside the cell for the desired time (10-30 s), the nanotweezer tip was retracted from the cell while holding the AC voltage on, to complete the extraction. Switching off the AC voltage across the nanotweezer electrodes turns off the dielectrophoretic field leading to the release of DNA/RNA molecules from the nanotweezer tip.

Figure 7:
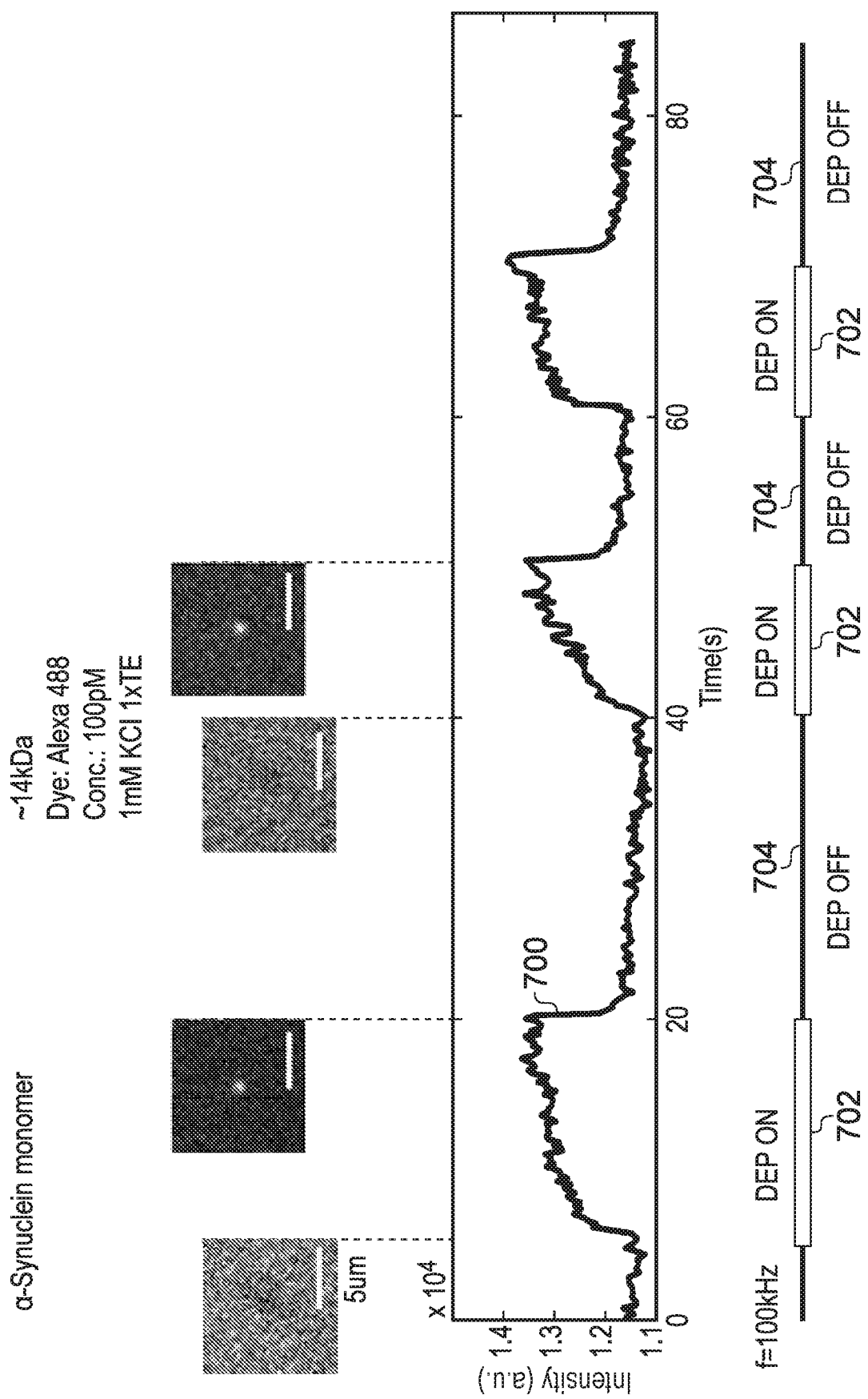
FIG. 7 illustrates a plot of fluorescence intensity against time for on periods of dielectrophoresis and off periods of dielectrophoretic trapping of protein molecules.

FIG. 7 provides a plot 700 of fluorescence intensity against time for on periods 702 of dielectrophoresis and off periods 704 of dielectrophoresis. The fluorescence intensity is approximately 2 orders of magnitude higher in the on periods 702 than in the off periods 704. Example micrographs during the on and off periods 702, 704 are also provided in FIG. 7, which generally show no illumination until initiation of the on period 702 and a bright feature (coincidental with the tip of the nanotweezer) at the end of the on period 702.

Figure 8:
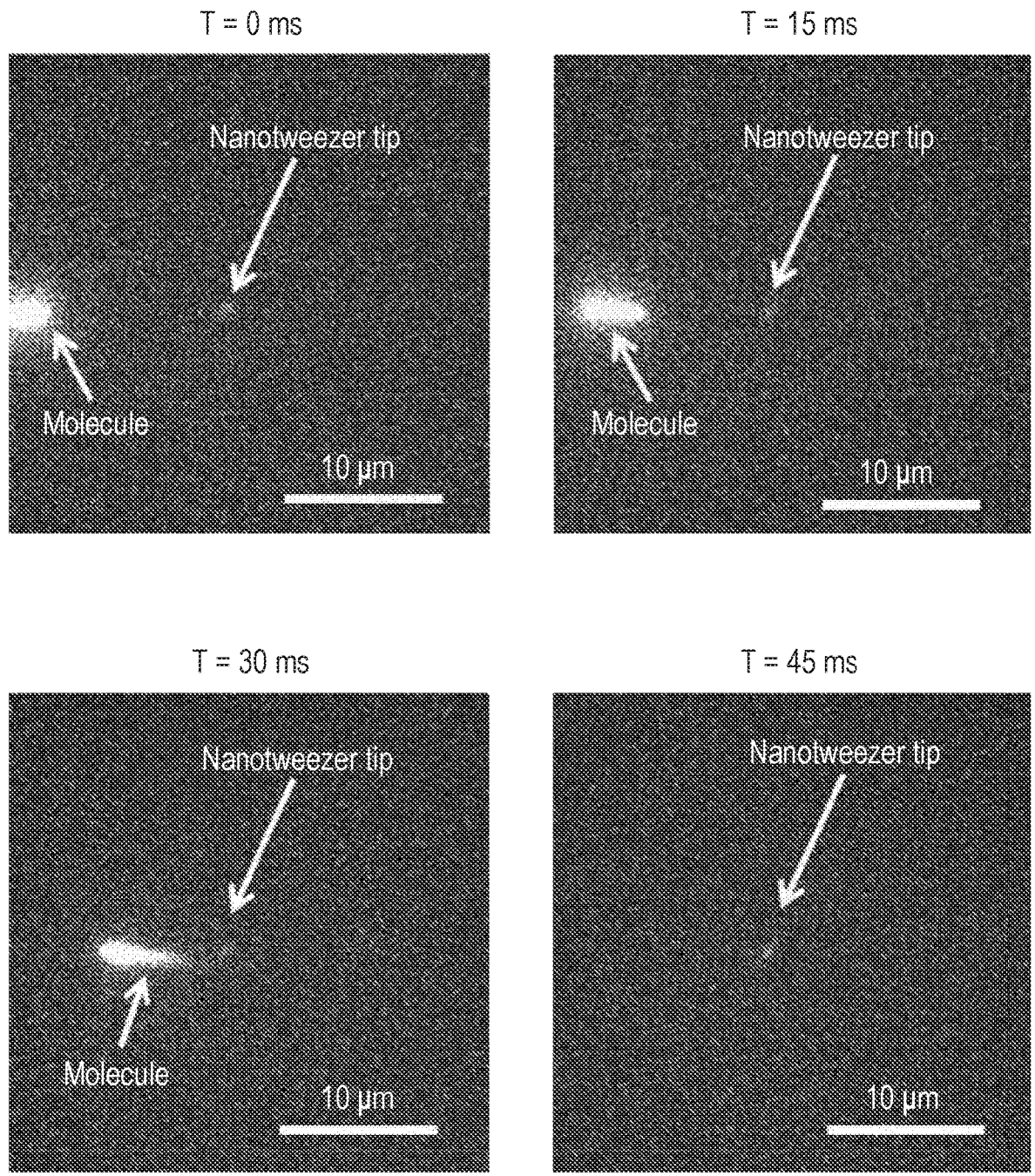
FIG. 8 illustrates the luminosity found at the tip of the nanotweezer during dielectrophoretic trapping of single DNA molecule in a time-lapse series of micrographs.

FIG. 8 shows a series of micrographs illustrating the luminosity found at the tip of the nanotweezer during a period of dielectrophoresis. The series of images are arranged in increments of 15 milliseconds from 0 to 45 milliseconds of an applied AC waveform. In FIG. 8, the luminous region (which relates to the position of molecules of interest) moves from right to left as it is attracted to the nanotweezer.

Figure 9A:
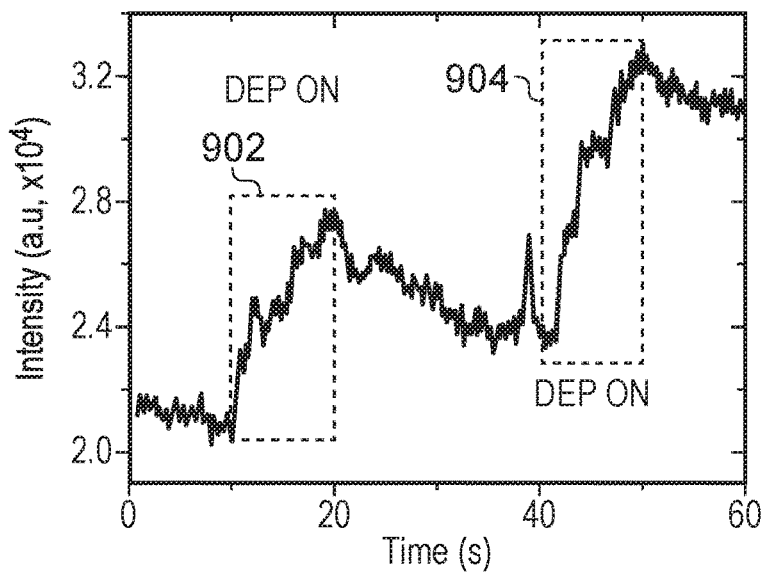
FIGS. 9a to 9c illustrate profiles of fluorescence intensity against time during periods of dielectrophoretic trapping of single DNA molecule.

FIG. 9*a* illustrates a profile of fluorescence intensity against time during a period in which two pulses of dielectrophoresis are applied to a nanotweezer. The first pulse 902 is applied between 10-20 seconds and a second pulse 904 is applied between 40-50 seconds. During the first pulse 902, the intensity increases from about $2 \times 10^4$ to about $2.8 \times 10^4$ au. Following the first period 902, the intensity falls from about $2.8 \times 10^4$ to about $2.4 \times 10^4$ au. During the second period 904, the intensity increases from $2.4 \times 10^4$ to $3.2 \times 10^4$.

Figure 9B:
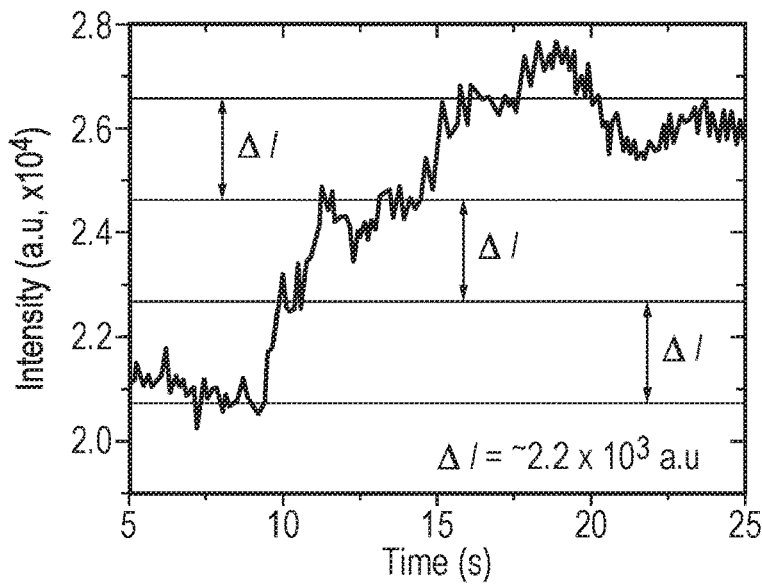

FIG. 9*b* illustrates a blown-up portion of FIG. 9*a* that corresponds to the first period 902 in which a dielectrophoretic pulse is applied. The fluorescence intensity is annotated with marking showing a luminosity (ΔI) that relates to the expected luminosity that would be found following the attraction of a single target molecule. The increase in intensity relates to the trapping of 3 molecules.

Figure 9C:
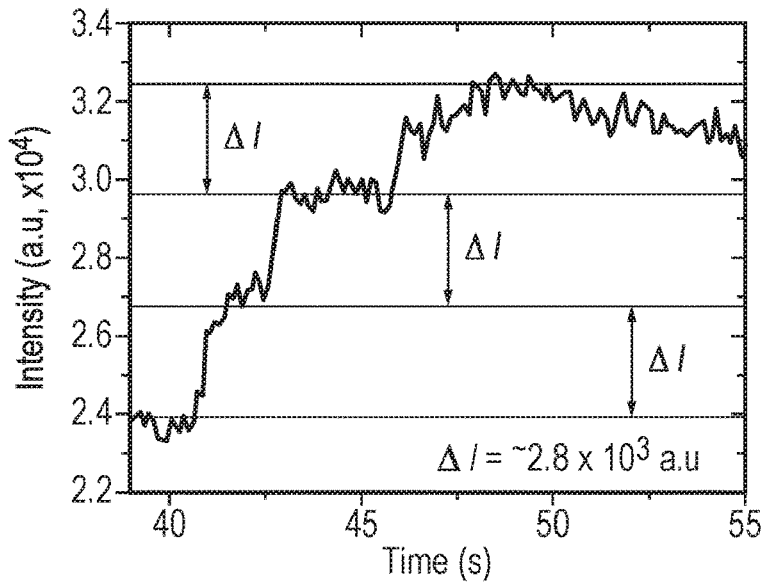

FIG. 9*c* illustrates a blown up-portion of FIG. 9*a* that corresponds to the second period 904 in which a dielectrophoretic pulse is applied. The fluorescence intensity is annotated with marking showing a luminosity (ΔI) that relates to the expected luminosity that would be found following the attraction of a single target molecule. The increase in intensity relates to the trapping of 3 molecules. The variation of fluorescence between two cycles can be due to the drift in focal plane of the detector cause by thermal/mechanical drift of the micromanipulator used to hold the nanotweezer.

FIGS. 10*a* to 10*d* illustrate profiles which demonstrate the positive identification of target DNA following extraction using a dielectrophoretic nanotweezer.

Figure 10A:
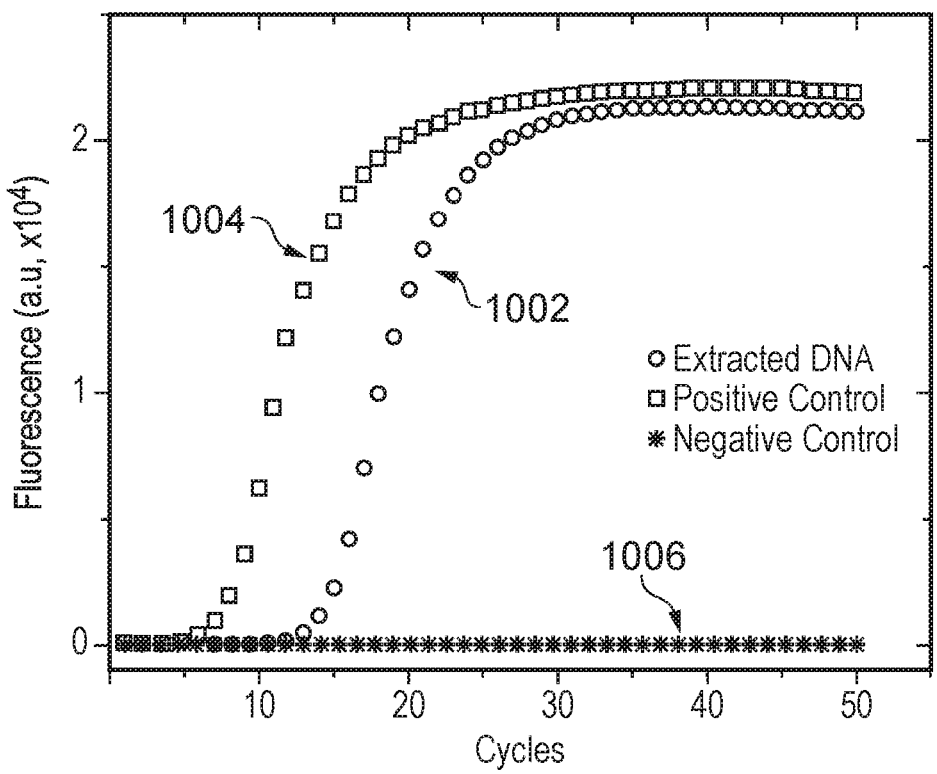
FIGS. 10a to 10d illustrate profiles which demonstrate the positive identification of target DNA following extraction using a nanotweezer.
Figure 11A:
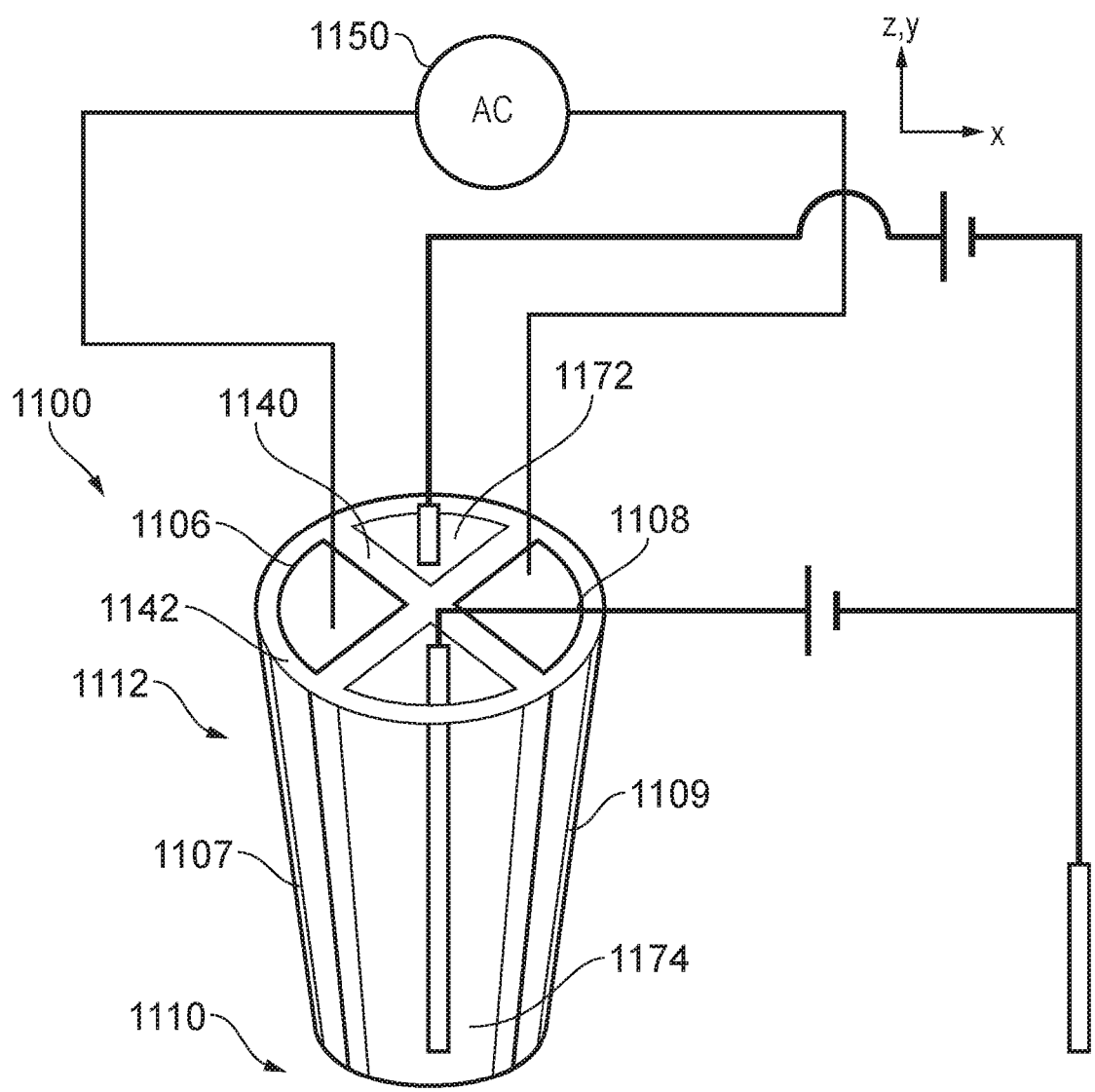
FIG. 11a illustrates a schematic partial cutaway view of a dielectrophoretic tweezer.

FIG. 10a illustrates a profile of fluorescence against the number of cycles of a quantitative polymerase chain reaction (qPCR) protocol using Lambda DNA (L-DNA) trapped by the nanotweezer. Amplification curve 1002 for the trapped L-DNA followed a similar form to the profile of a positive control sample 1004 and differ substantially from a negative control sample 1006.

Figure 10B:
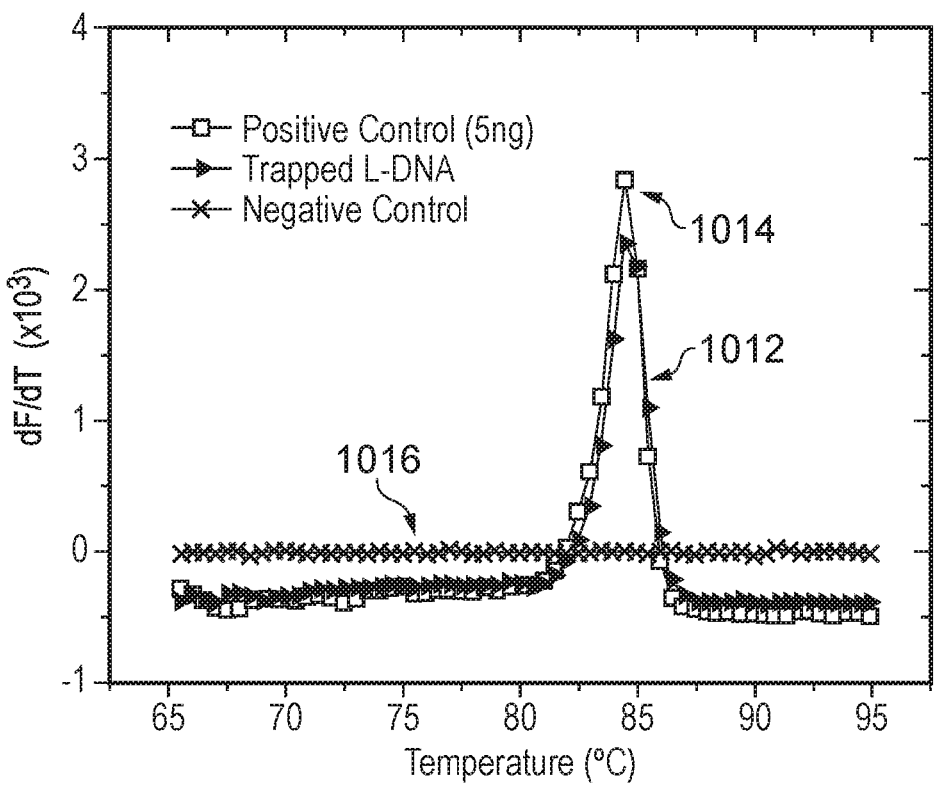

FIG. 10b illustrates a profile of corresponding melting curves recorded for the amplification of A-DNA trapped by the nanotweezer. The profile illustrates the differential of fluorescence with respect to temperature plotted against temperature. The melting peak at 84° C. observed for both the samples 1012 and the positive control 1014 were in close agreement with that calculated for the amplified sequence (85° C.). No melting peak was observed in case of the negative sample (water) 1016 eliminating the possibility of primer dimer formation during amplification.

Figure 10C:
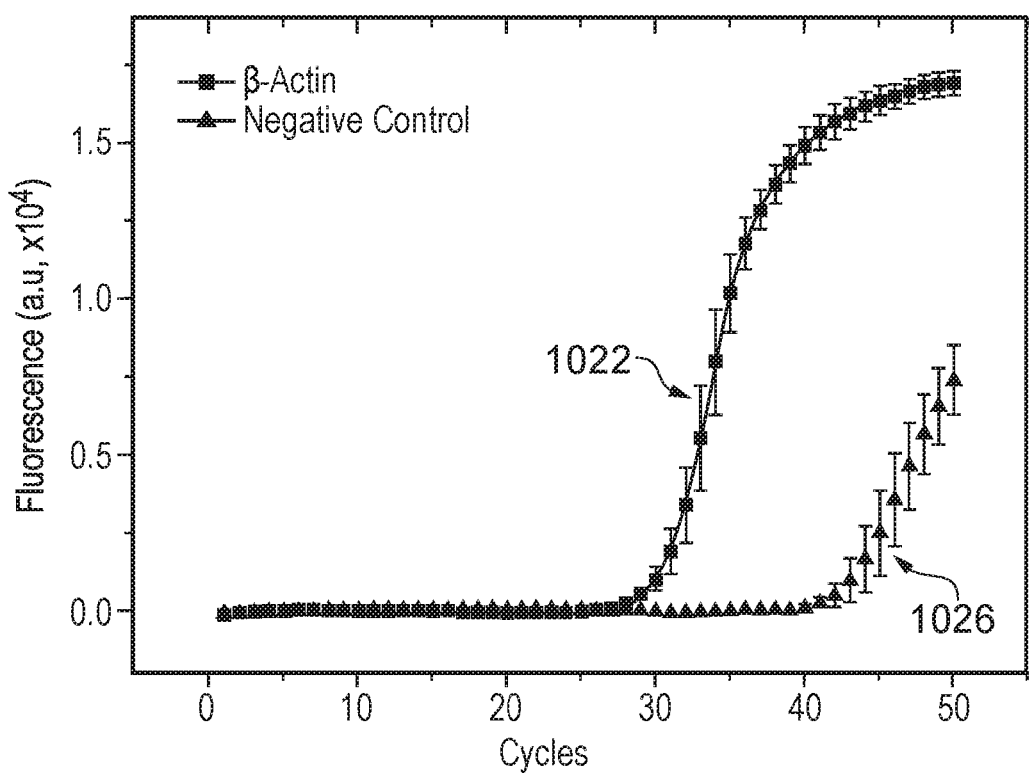

FIG. 10c illustrates another profile of fluorescence against the number of cycles of a quantitative polymerase chain reaction (qPCR) performed using DNA trapped by the nanotweezer during single cell nanobiopsy. An amplification curve 1022 for the trapped DNA differ substantially from a negative control sample 1026.

Figure 10D:
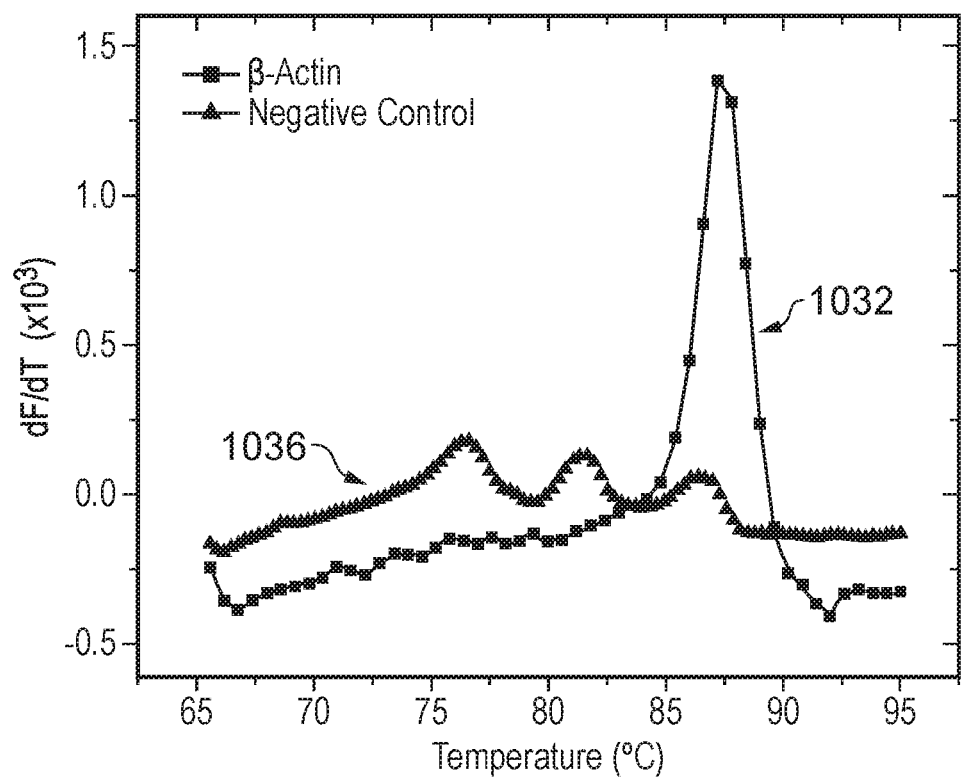

FIG. 10d illustrates a profile of corresponding melting curves recorded for the amplification of DNA trapped by the nanotweezer during single cell nanobiopsy described above with reference to FIG. 10c. The profile illustrates the differential of fluorescence with respect to temperature plotted against temperature. The melting peak 1032 observed at 87° C. is in close agreement with that calculated for the amplified sequence (86.5° C.). No melting peak was observed in case of the negative sample (water) 1036, eliminating the possibility of primer dimer formation during amplification.

Figure 16:
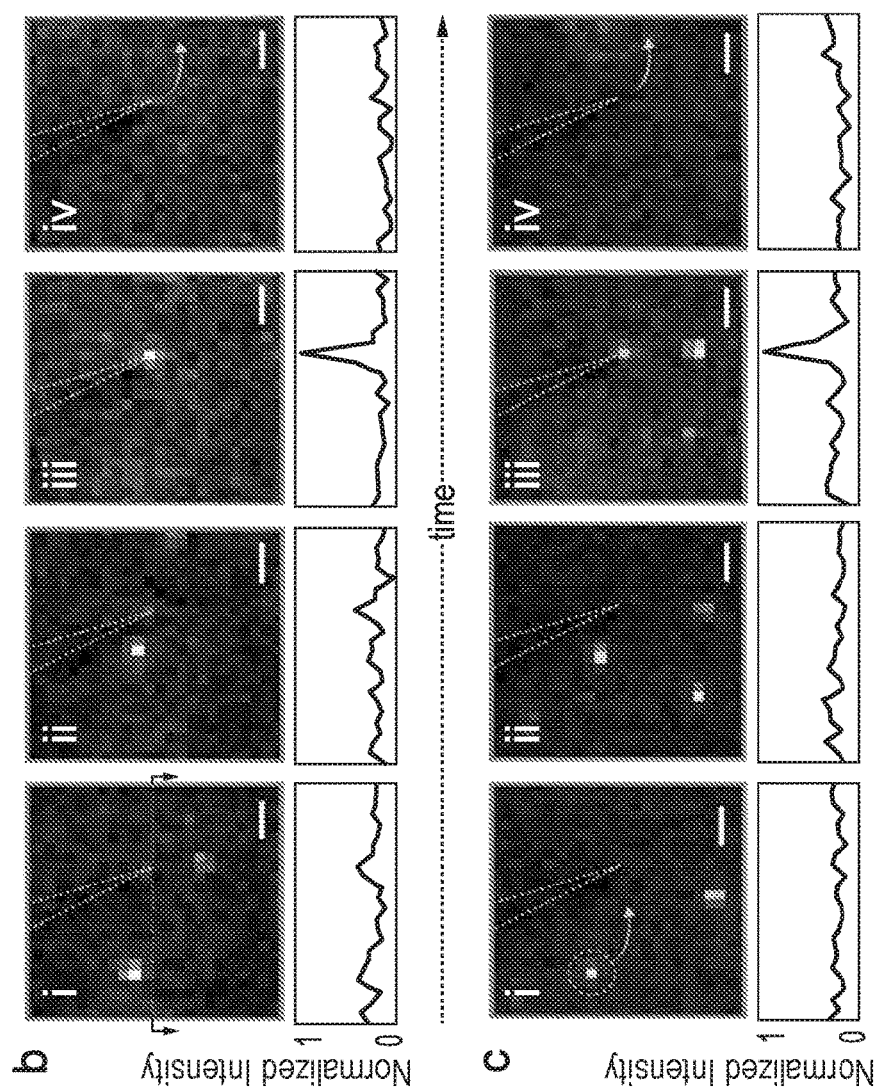
FIG. 16 illustrates aspects of the use of a nanotweezer in single-molecule manipulation
Figure 16:
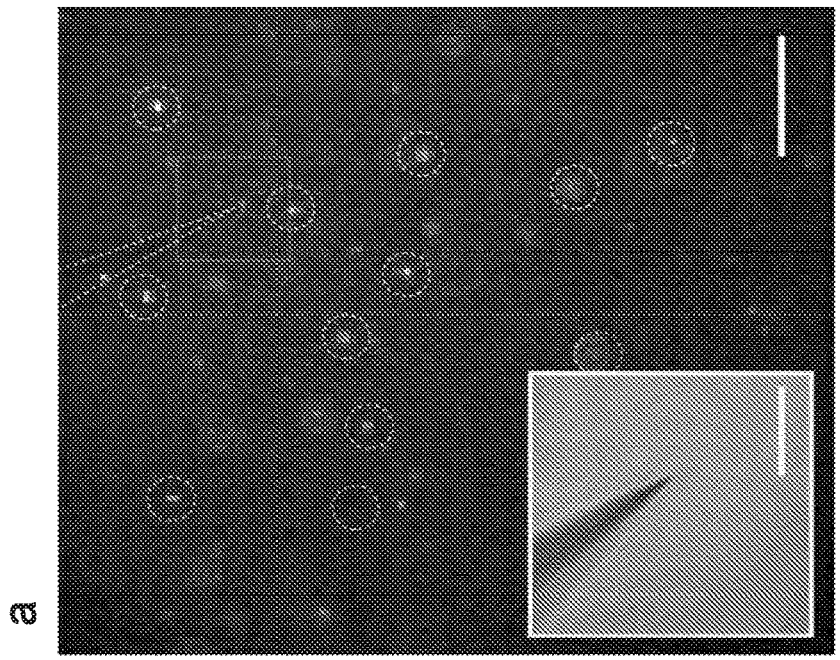
Figure 16:
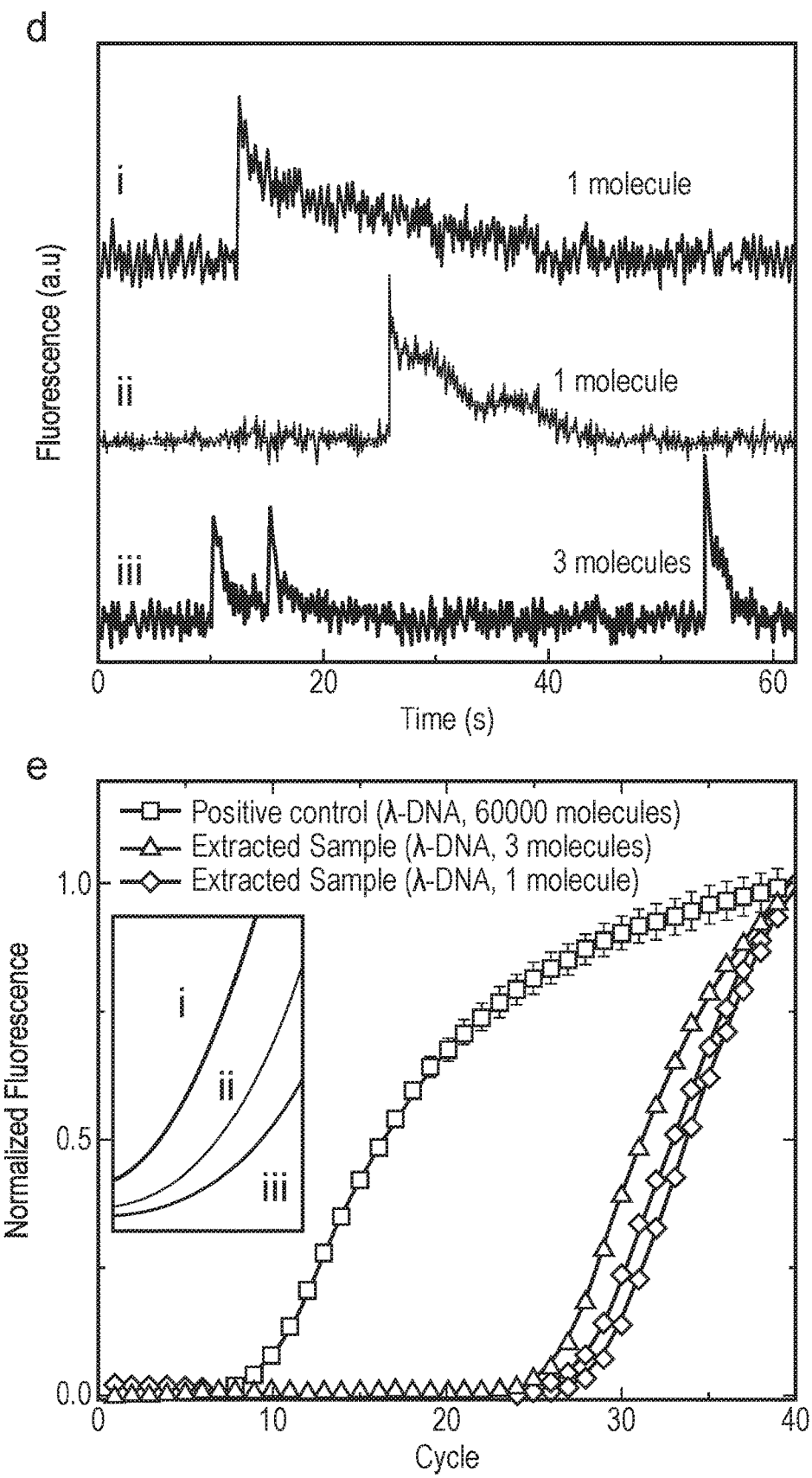
Figure 16:
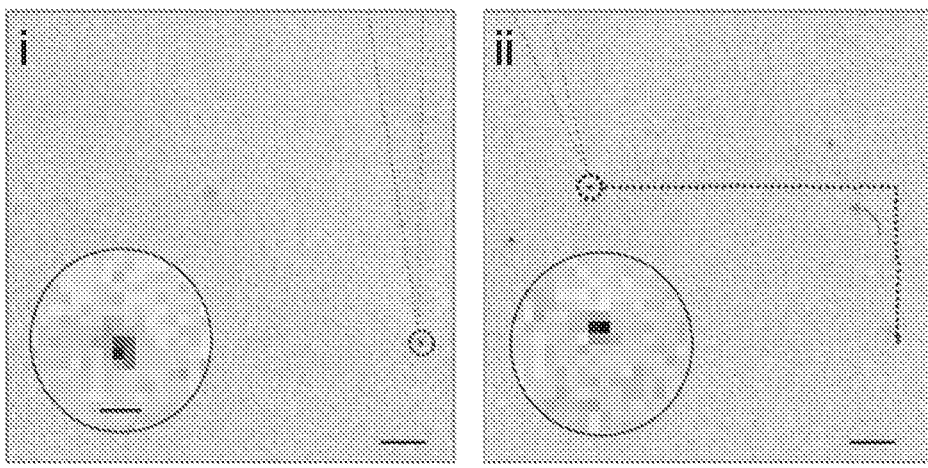
Figure 16:
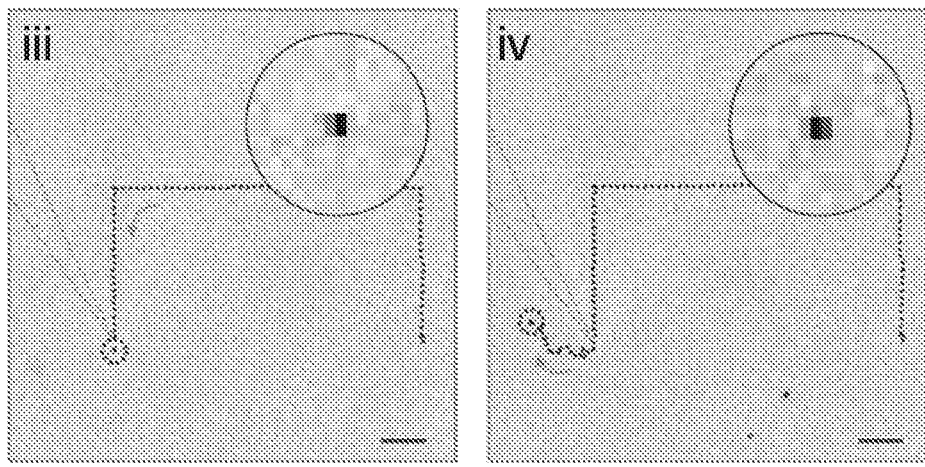

Turning to FIGS. 16a to 16g, aspects of the use of a nanotweezer in single-molecule manipulation are illustrated. FIG. 16a illustrates a fluorescence image showing YOYO-1 labelled 10 kbp DNA (highlighted with dashed circles) along with a bright field image displayed as an inset (scale bars 20 μm). FIGS. 16b and 16c illustrate two different series of time sequence micrographs of trapping and release of individual DNA molecules (1 mM KCl solution, $f_A$=2 MHz, $V_{pp}$=20 V, scale bar 4 μm). The normalized intensity is illustrated below each micrograph in FIGS. 16b and 16c. FIG. 16d illustrates fluorescence-time traces showing single A-DNA trapping events ($V_{pp}$=10 V, $f_A$=6 MHz). FIG. 16e illustrates amplification curves obtained from the qPCR of DEP-trapped A-DNA molecules shown in FIG. 16d. FIG. 16f illustrates a sequencing showing a near perfect match between the extracted DNA (Query) aligned with the corresponding A-DNA sequence (subject). FIG. 16g illustrates 'Pick-and-place' of single molecules (scale bars: 5 μm, insets 1 μm):

(i) the DNA molecule was captured at the nanotweezer tip by turning on the AC field.
(ii) and (iii) transfer of the captured single molecule from one position to another by moving the nanotweezer using a micromanipulator to apply an AC field during transport.
(iv) release of the captured molecule by turning off the DEP.

By decreasing the DNA concentration down to 100 fM it may be possible to improve the process to trap individual molecules. Time-dependent images along with pixel intensity profiles are shown at various stages of trapping and release process FIGS. 16b and 16c (i-iv). Much like at higher concentrations, upon application of the AC field, the molecule is first pulled towards the nanotweezer tip. Once inside the trapping volume, the molecule stays there as long as the AC field is kept on. This was further demonstrated for three different nanotweezers using A-DNA, FIG. 16d. Fluorescence intensity vs time traces are shown for two tips where a single molecule is trapped (i-ii) and another where three molecules are sequentially trapped (iii). Corresponding qPCR amplification curves are shown in FIG. 1e confirming nearly 100% amplification of the trapped molecules. Furthermore, sequencing confirmed that the amplified segment was >99% identical to the corresponding segment of A-DNA, as shown in FIG. 16f.

The nanotweezer may be used in combination with an XYZ (3 dimensional) positioning platform to perform 'pick-and-place' type measurements where single molecules can be trapped, moved at a velocity as high as 30 μm s$^{-1}$ and then released. This is demonstrated for 10 kbp DNA as is shown in FIG. 16g where a single molecule is tracked using an image tracking algorithm to follow the trajectory of the molecule from capture (i) to movement in the x-y plane (ii-iii) and subsequent release (iv).

Having established the capability of trapping single-molecules in free solution, we demonstrate their suitability for highly localised single cell biopsies. It has been found that it is possible to use the tweezer to:
  target different compartments in a cell, such as the nucleus and cytoplasm,
  selective sample cellular building blocks (e.g. DNA, RNA, organelles and beads), and
  the versatility of using of the extracted material in standard biomolecular assays.

Figure 17:
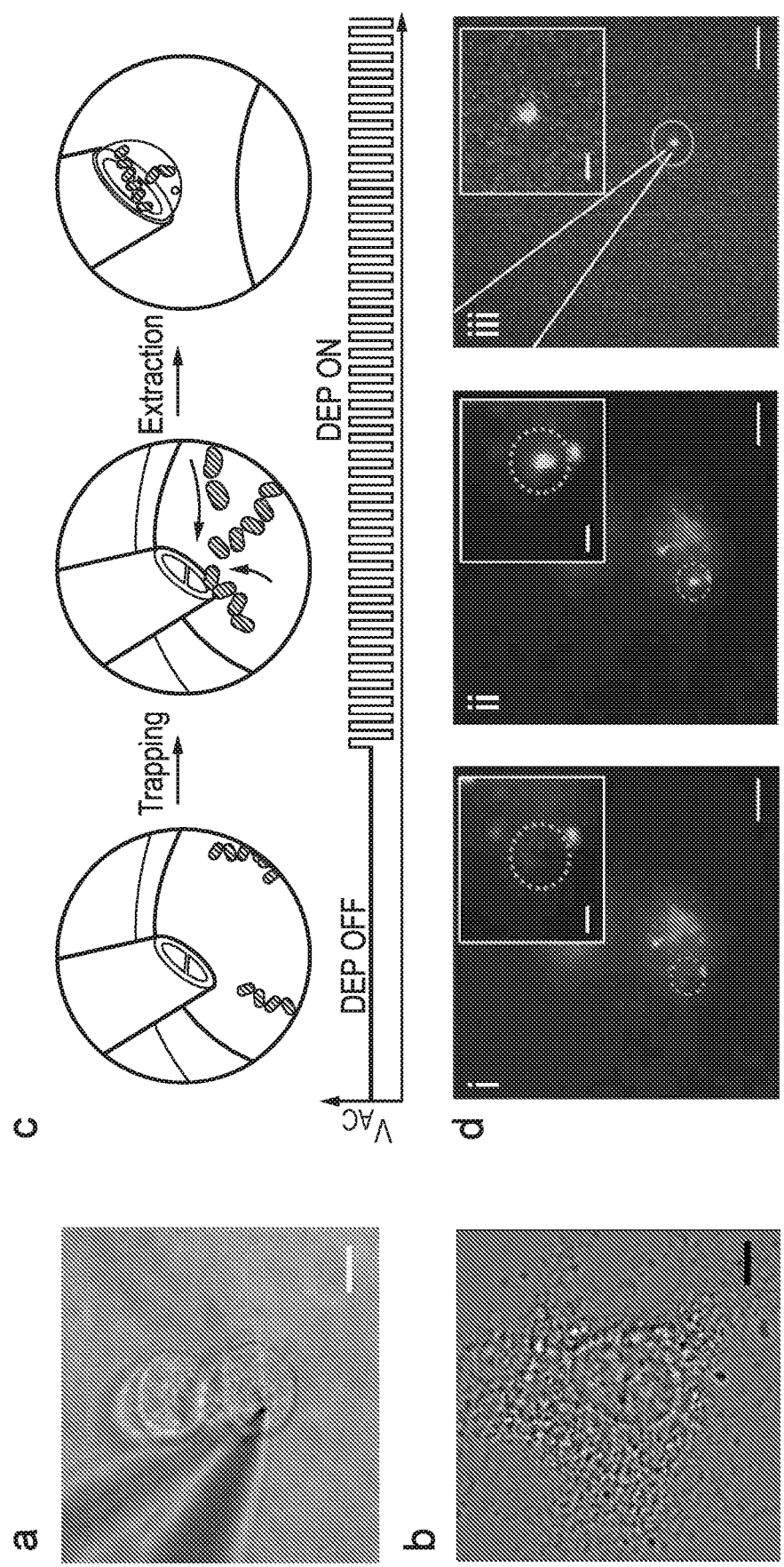
FIG. 17 illustrates aspects of DNA extraction from the cell nucleus.
Figure 17:
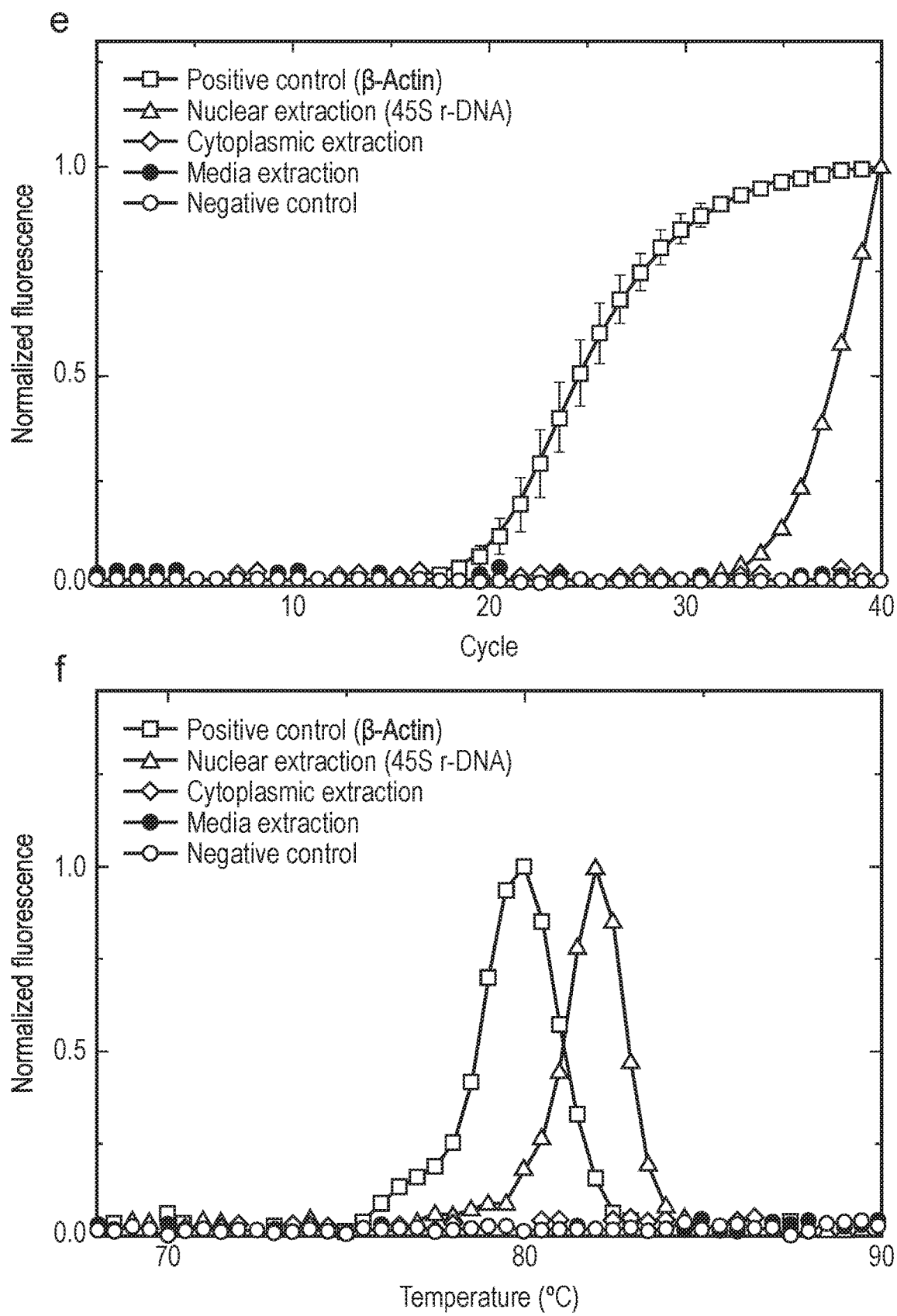

FIGS. 17a to 17g illustrate aspects of DNA extraction from the cell nucleus. FIG. 17a illustrates an optical micrograph showing the nanotweezer inside the cell. FIG. 17b illustrates an optical micrograph illustrating a typical HPAEC human cell (scale bar: 5 μm). FIGS. 17c and 17d illustrate respective step-by-step schematics and corresponding fluorescent images of a single cell biopsy (Scale bars: 10 μm, insets 2 μm):

i) the tip approached, and then was inserted into, the cell nucleus.
ii) application of an AC bias traps DNA fragments at the nanotweezer tip, as can be seen by an increase in fluorescence signal around the tip.
iii) in the final step, the nanotweezer along with the accumulated material was withdrawn from the cell, and the presence of DNA was confirmed by a fluorescence spot localised at the end of the tip.

In this way, immortalized U2OS and HPAEC human cells were utilised to sample genetic material from the nucleus. To visualise the extraction of DNA, U2OS cells were stained using a DNA binding dye (DAOTA-M2). The nanotweezer was approached towards the cell using a micromanipulator and imaged using optical microscopy. The tip was inserted into the cell nucleus, and an AC bias applied ($f_A$=1 MHz, $V_{pp}$=20 V). Analogous to the solution-based extraction, DNA molecules were concentrated at the tip as can be seen by the localised increase in fluorescence. After being held inside the nucleus for the desired time (10 s), the nanotweezer tip was retracted from the cell with the AC voltage kept on, to complete the extraction. A fluorescent spot at the tip confirmed the successful extraction. This strategy could also be implemented for performing label-free single cell biopsies.

FIGS. 17e and 17f illustrate qPCR amplification and melting curves of the extracted DNA using 45S ribosomal DNA specific primers. Error bars indicate the standard deviation of 4 individual measurements. DNA was sampled from the nucleus of unstained HPAEC cells and then subjected to qPCR amplification of a target sequence in 45S ribosomal DNA (rDNA). A part of the 45S rDNA sequence was amplified using a pair of specific primers along with ACTB DNA template as the positive control. A $C_t$ value of 33±1 confirmed the presence of 45s rDNA sequence on the extracted sample at the nanotweezer tip. Since 45S rDNA arrays, or clusters, are present in nucleolus, on human chromosomes 13, 14, 15, 21 and 22, with total diploid copy number ranging from 60 to >800 repeat units it is highly likely that the DNA extracted contains at least one copy of 45S rDNA, confirming that such nanotweezers may be suitable for rare molecule analysis in some applications. Melting curves confirmed a peak at 82° C. No significant amplification or melting peak was observed in case of the control experiments using nanotweezers held inside the HPAEC cell cytoplasm, growth media, or DI water (negative control).

FIGS. 18a to 18d illustrate aspects of mRNA extraction from a cytoplasm.

Various scalebars are used in FIG. 18a: i) 25 μm (inset: 5 μm); ii) 10 μm (inset: 2 μm); iii), iv) 1 μm. FIG. 18a(i) illustrates targeted mRNA trapping and extraction, which was performed by labelling 1802, via in situ hybridisation, a specific ETS-1 mRNA with FITC. FIG. 18a(ii) illustrates a high-resolution image of individual ETS-1 mRNA along with a superimposed bright field image (inset). FIG. 18a(iii) illustrates that the application of an AC voltage to the tweezer results in trapping of the mRNA at the nanotweezers tip 1804, which was then pulled away by the subsequent withdrawal of nanotweezers to cause a drop in the fluorescence signal, as shown in FIG. 18a(iv).

Figure 18:
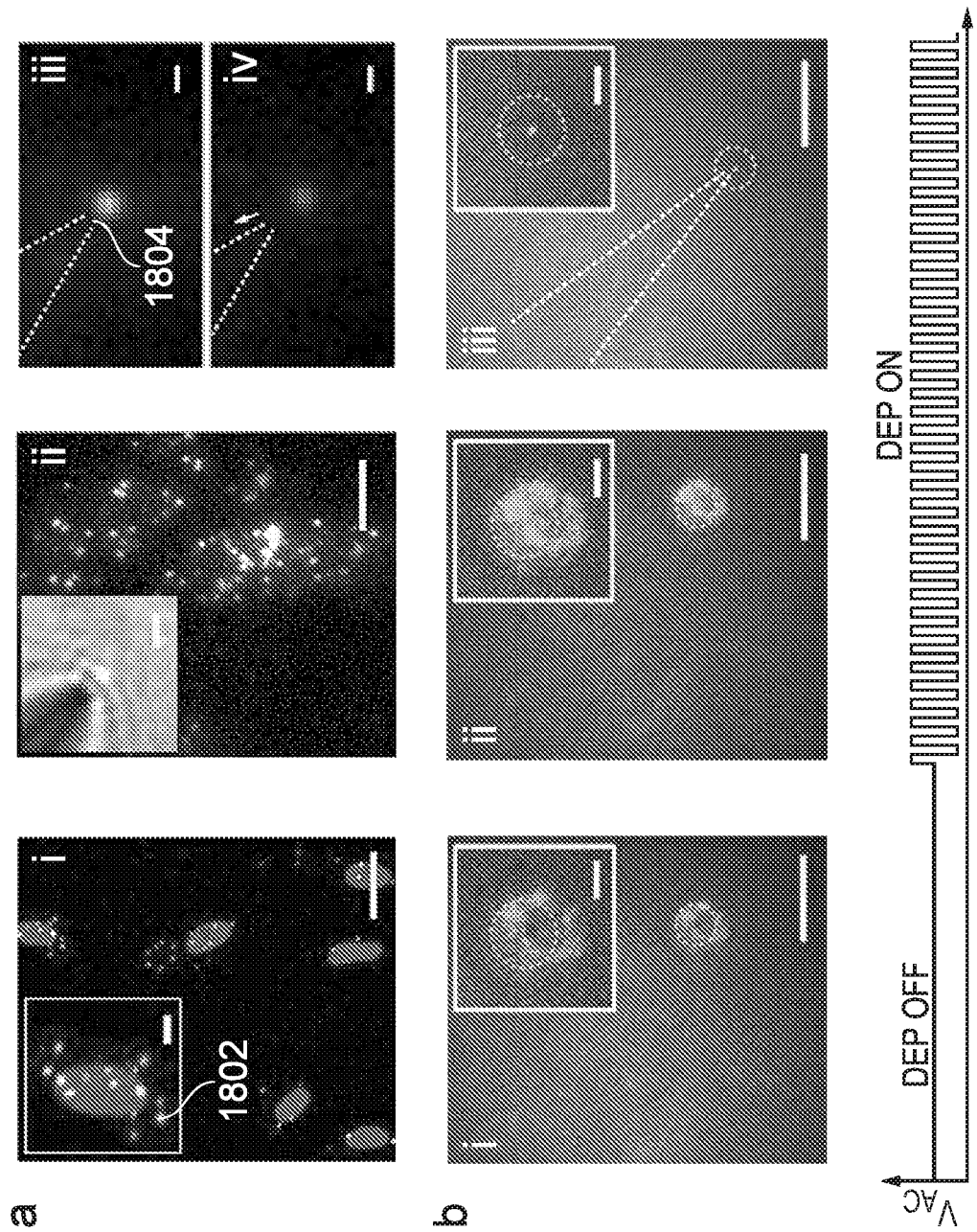
FIG. 18 illustrates aspects of mRNA extraction from a cytoplasm.
Figure 18:
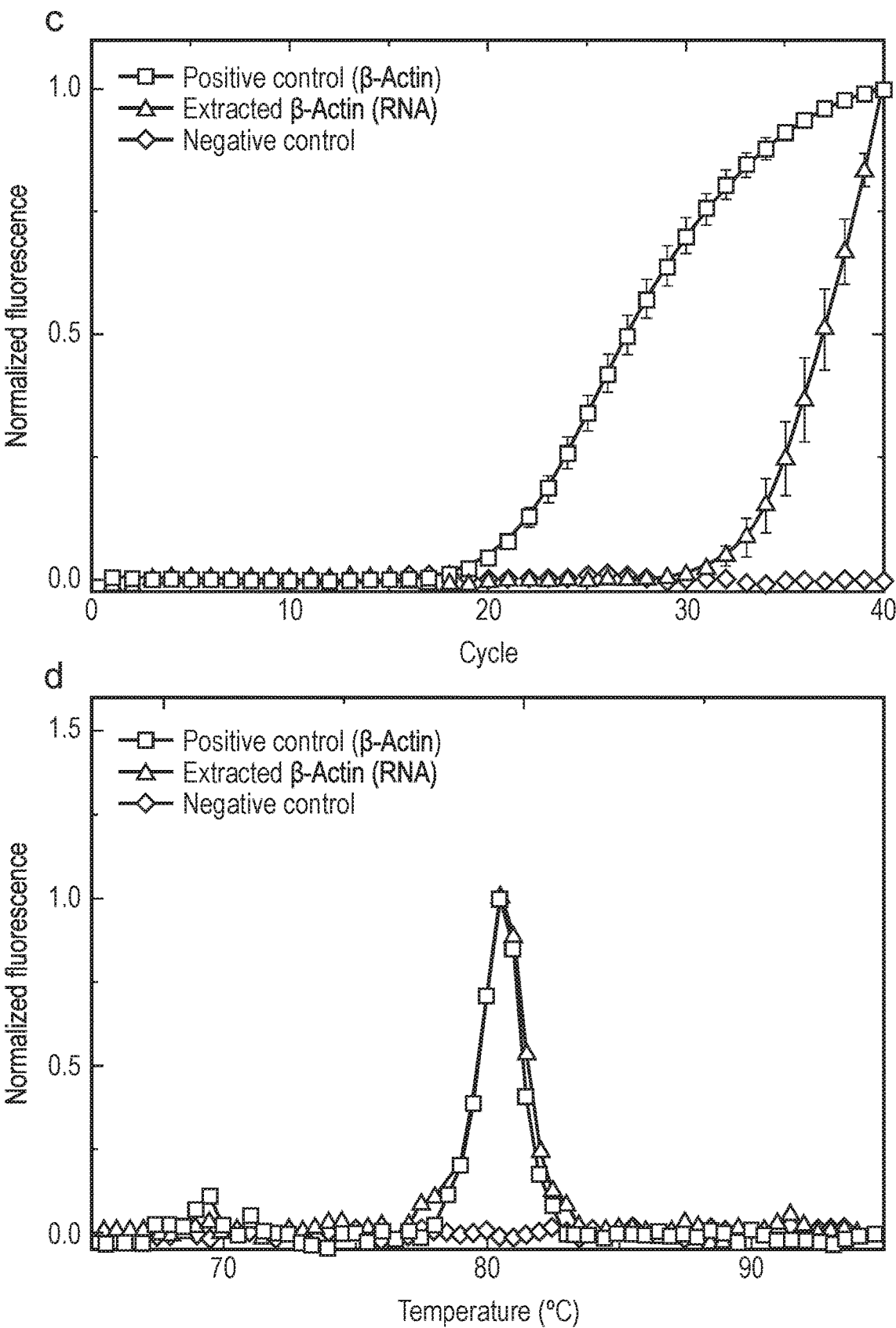

FIG. 18 demonstrates the ability to operate the nanotweezer at the single molecule level is by withdrawing individual mRNA molecules from the cytoplasm of HPAEC cells. Proto-n Oncogene 1 Transcription Factor (ETS-1) mRNA was first fluorescently labelled with fluorescein using in situ hybridisation. The step-by-step biopsy procedure was identical to the one described above:

the nanotweezer was positioned adjacently to the selected mRNA (FIG. 18a (ii)), then captured (FIG. 18a (iii)) and subsequently withdrawn from its original position (FIG. 18a (iv)).

FIG. 18b illustrates biopsies performed in cells stained with a non-specific RNA dye (RNA Select®). The accumulation of labelled mRNA around the nanotweezers during DEP capture results in an increase in fluorescence at the nanotweezers tip, as shown in FIG. 18b(i)-(ii). In FIG. 18b(iii), mRNA can still be seen at the tip once extracted from the cell (scale bar: 20 μm and 5 μm for the insets). Sampling of RNA material was repeated using a different cell-permeable dye (SYTO™ RNASelect™), which selectively binds to the RNA molecules inside the cytoplasm (FIG. 18b) and can be extracted as confirmed by the fluorescent spot at the very end of the tip FIG. 18b(iii).

FIGS. 18c and 18d illustrate qPCR amplification and melting curves obtained for ACTB cDNA synthesised from the extracted sample. Error bars indicate the standard deviation of 4 individual measurements.

Due to the small trapping volume of the nanotweezer, the probability of trapping low copy number mRNAs inside the cell is significantly lower. This was verified by confirming the presence of two low copy number mRNAs (<100), ETS-1 and Kruppel-like Factor-2 (KLF-2) and one high copy number (>1000) mRNA, beta-actin (ACTB). The mRNAs in the extracted sample was reverse transcribed, and the subsequently obtained cDNA was then subjected to qPCR. A part of the sequence in the cDNA was amplified using a pair of primers specific to ETS-1, KLF-2 and ACTB gene sequences. In the case of ETS-1 and KLF-2, no amplification was observed. However, ACTB was successfully amplified. Omitting the unsuccessful biopsies, without mRNA hits (~50%), an average $C_t$ value of 35±2 for the extracted samples was obtained corresponding to an initial copy number ranging between 45 and 179 ACTB cDNA molecules.

The melting curves in FIG. 18d show a single melting peak at 80.5° C. for ACTB and RNA, which is in good agreement with the predicted value of 81° C. No melting peak was observed in case of the negative control (RNase free water).

The possibility of performing multiple sample extractions at different time points from the same cell was also assessed. In this case, two biopsies were carried out one hour apart from each other in different cytoplasmic locations. The viability of the cell after the two biopsies was monitored for up to 16 hours to rule out any significant cell membrane damage during/after the extraction process.

Figure 19:
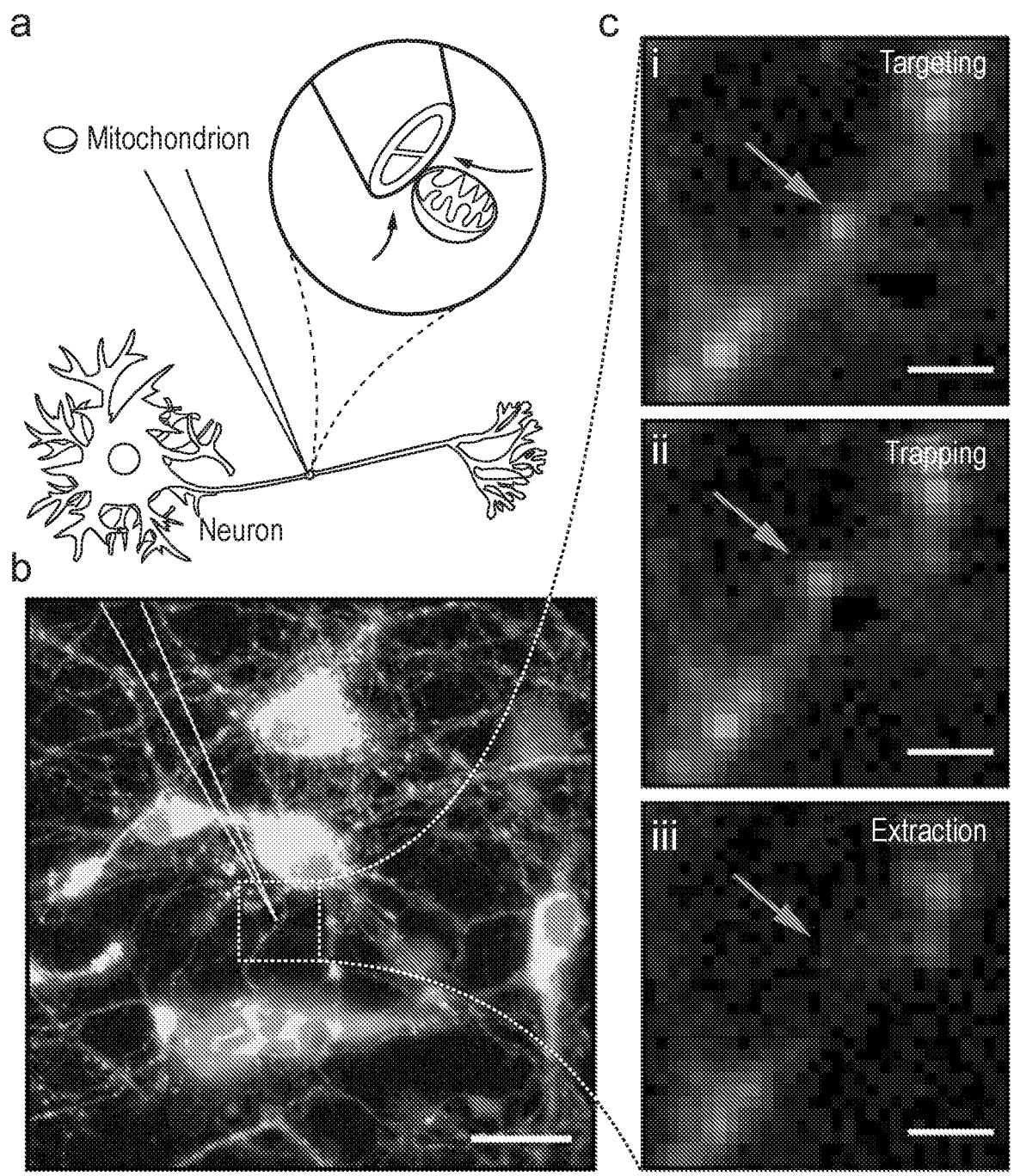
FIG. 19 illustrates aspects of the use of a nanotweezer to manipulate subcellular structures such as organelles.
Figure 19:
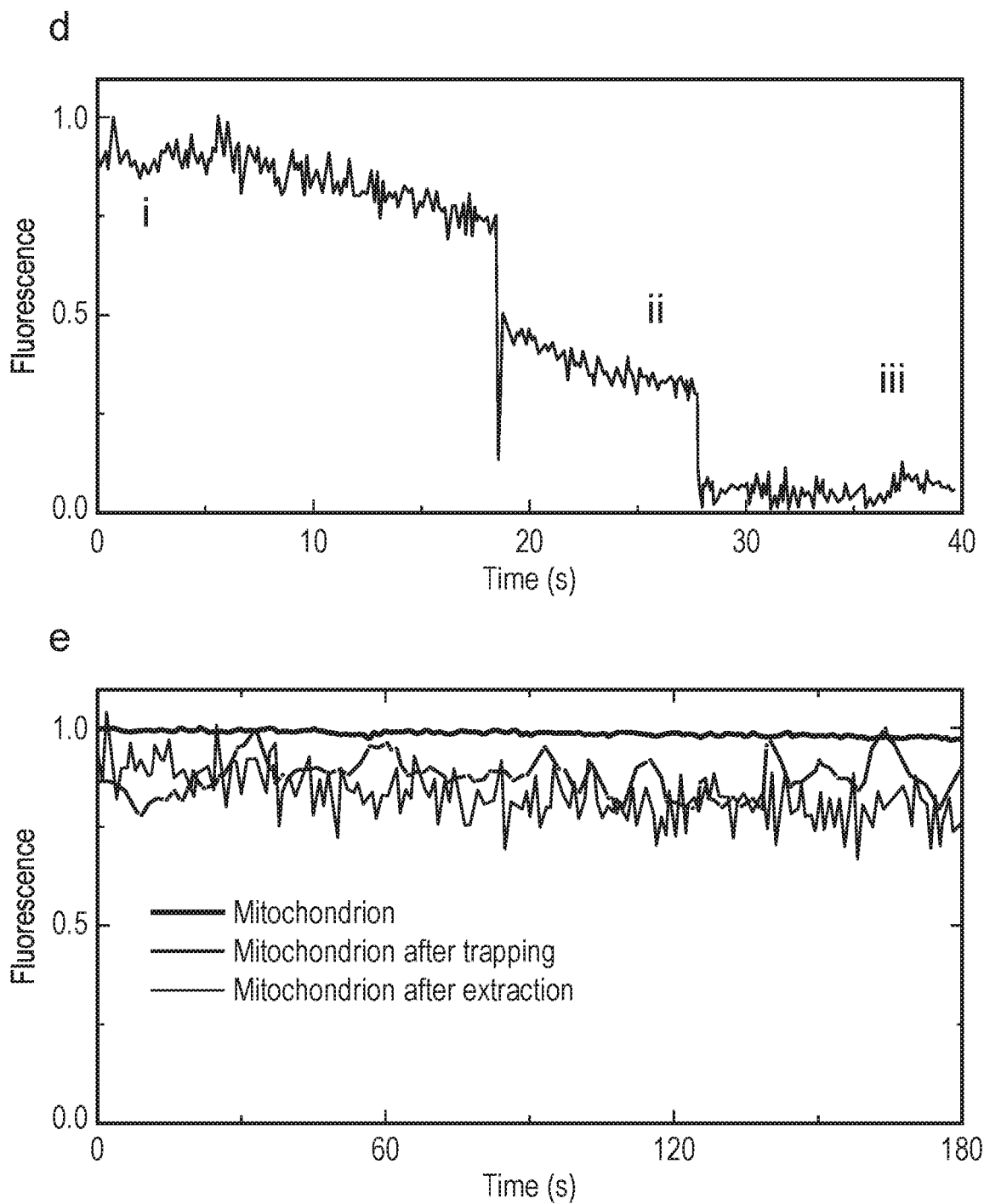

FIG. 19 illustrates aspects of the use of the nanotweezers to manipulate subcellular structures such as organelles. FIG. 19a illustrates a schematic of single mitochondrion extraction from the axon of mouse primary hippocampal neurons. FIG. 19b illustrates mitochondria that have been selectively stained using MitoTracker Green and optically visualised inside the neuron cells (scale bar 20 μm).

FIGS. 19c(i) to (iii) illustrate stages in the targeting, trapping and extraction of a stained mitochondria. In FIG. 19c(i), the nanotweezers is positioned close to a labelled mitochondrion. Upon application of an AC field, the mitochondrion is attracted towards the tip, as shown in FIG. 19c(ii) and is subsequently removed from the neuron, as illustrated by its absence in FIG. 19c(iii). As seen in FIG. 19c, the force exerted by the nanotweezer ($f_A$=1 MHz, $V_{pp}$=10 V) was sufficient to trap and extract the mitochondrion from the neuron. This process demonstrated in FIG. 19c was confirmed by monitoring a variation in fluorescence signal at the extraction point. The fluorescence at intervals corresponding to the snap-shots of FIG. 19c(i) to (iii) is plotted as a function of time in FIG. 19d.

The viability of extracted mitochondria was validated by repeating this experiment with mitochondria labelled with tetramethylrhodamine methyl ester (TMRM), a dye that is readily sequestered by active mitochondria and reflects intact mitochondrial membrane potential. FIG. 19d illustrates profiles of fluorescence of TMRM labelled mitochondrion in i) intact, ii) trapped and iii) extracted state (scale bars 2 μm).

FIG. 19e shows the fluorescence-time trace recorded at the mitochondrion before, during and after the trapping. No significant loss in fluorescence was observed during the trapping and extraction of the mitochondrion, suggesting the feasibility of using the nanotweezer for single organelle transplantation.

Returning to FIGS. 11a and 11b, schematic partial cut-away views of a dielectrophoretic tweezer 1100 are illustrated. The dielectrophoretic tweezer 1100 is similar to that described previously with reference to FIGS. 1, 4A and 4B in that it has a distal end 1110, except that it comprises four cavities that are defined by a cross-shaped electrically insulating barrier 1140 and a tubular wall 1142.

The cross of the barrier 1140 is defined in a lateral plane (x-y) of the dielectrophoretic tweezer 1100 and runs along a longitudinal length (z) of the dielectrophoretic tweezer 1100 between the distal and proximal ends of the tweezer 1140, 1142. A first electrode 1107 is defined in a first cavity 1106 and a second electrode 1109 is defined in a second cavity 1108. The first cavity 1106 is provided as an opposing cavity to the second cavity 1108, defined by the cross shaped electrically insulating barrier 1140.

The first and second electrodes 1107, 1109 are connected to a signal generator 1150 using a similar arrangement to that described previously with reference to FIG. 4a.

The dielectrophoretic tweezer 1100 also comprises a third cavity 1172 and an opposing fourth cavity 1174 defined by the cross-shaped electrically insulating barrier 1140. Each of the third and fourth cavities 1172, 1174 provides a channel between the distal and proximal ends of the tweezer 1140, 1142. Each of the third and fourth chambers 1172, 1174 is insulated and isolated from other chambers by the electrically insulating barrier 1140.

The provision of the third and fourth cavities 1172, 1174 therefore enable further functionality for the tubular structure.

The third and fourth cavities 1172, 1174 provide open barrels that may be filled with electrolyte and equipped with quasi reference counter electrodes. In this example, third and fourth electrodes may be provided within the respective third and fourth cavities 1172, 1174 at the proximal end 1112. The third and fourth electrodes may partially or entirely block fluid flow within the respective chambers. The third cavity 1172 can be used as a scanning ion-conductance microscope probe in order to accurately position the nanotweezer on to a position of a cell that is of interest, before an analyte, such as DNA or RNA is extracted from the cell. The built-in scanning ion-conductance microscope probe may also be used to gather spatially resolved information to enable to the localised evaluation of gene expressions.

In this example, the fourth cavity is also filled with electrolyte and can be used as a scanning ion-conductance microscope probe. Alternatively, the fourth electrode may be omitted from the fourth cavity 1174 to provide a hollow cavity. The hollow cavity may be used as a delivery system for chemical or biological molecules to be delivered into cell compartments so that the physiological effect of those molecules may be evaluated by subsequently trapping analyte expressions that result from modified cell behaviour using the dielectric nanotweezer and extracting the analyte as described previously with reference to FIGS. 5a-5d. The hollow chamber may also be used to extract molecules.

For example, the method may comprise applying pressure, suction or an electric field across the open chamber in order to collect the molecule of interest.

In general, the tubular wall may contain one or more further cavities in addition to the first and second cavities. Each cavity is defined by the electrically insulating barrier and the tubular wall and insulated and isolated from other cavities by the electrically insulating barrier.

A conventional scanning ion-conductance microscope may therefore be adapted for use with the dielectrophoretic tweezer 1100. The adapted scanning ion-conductance microscope has:
  a holder for holding the dielectrophoretic tweezer 1100;
  a conventional scanning ion-conductance microscopy monitoring circuit having terminals configured to measure a current between the third electrode of the dielectrophoretic tweezer and another electrode (the other electrode may be an electrode that is connected to the same or the fourth electrode of the dielectrophoretic tweezer);
  an actuator configured to move the first end of the dielectrophoretic tweezer 1100 with respect to a stage; and
  a signal generator configured to provide an alternating current to the first and second electrodes 1107, 1109 of the dielectrophoretic tweezer 1100. In use, the scanning ion-conductance microscope may also comprise the dielectrophoretic tweezer 1100. The scanning ion-conductance microscope may be used in combination with the cell biopsy apparatus described previously.

A controller may be provided for the microscope in order to operate the scanning ion-conductance microscopy monitoring circuit during a different time period to the signal generator in order to avoid generating interference in the scanning ion-conductance microscopy monitoring circuit due to the dielectrophoretic field generated by the first and second electrodes.

Figure 11B:
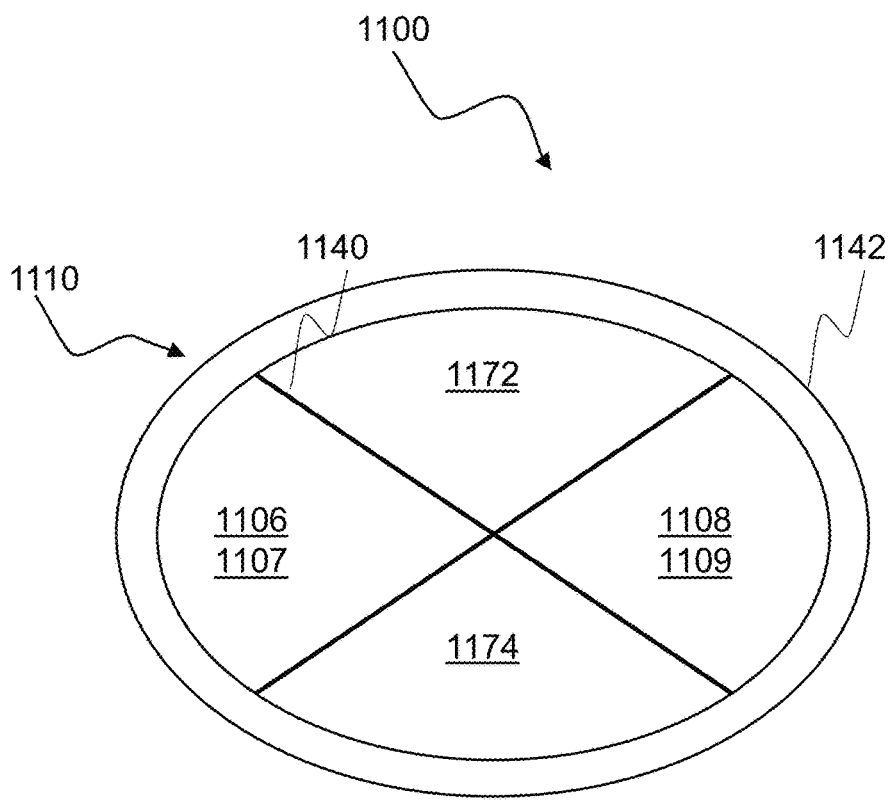

FIG. 11b illustrates a cross-section taken through the tubular structure 1120 described previously with reference to FIG. 11a at a distal end of the tubular structure.

Figure 11C:
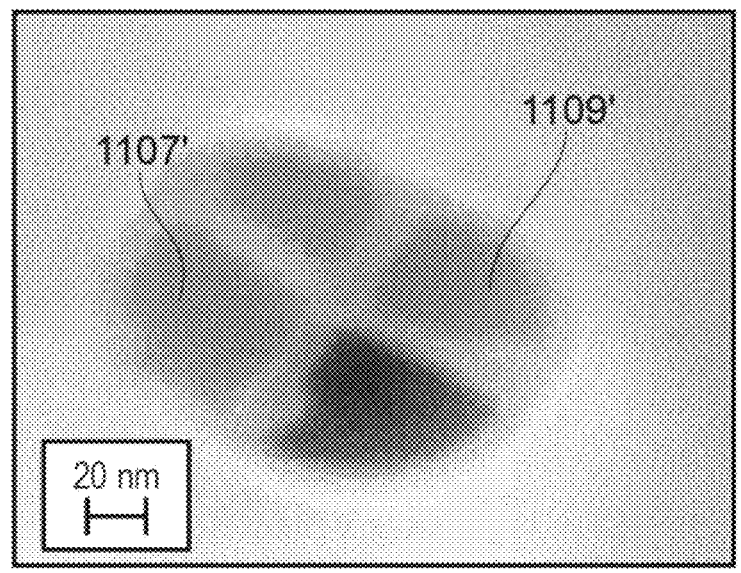
FIG. 11c illustrates a micrograph of a tubular structure corresponding to that illustrated in FIG. 11b.

FIG. 11c illustrates a micrograph of the distal end of a tubular structure corresponding to that illustrated in FIG. 11b. The interelectrode separation between the first electrode 1107' and the second electrode 1109' is approximately 20 nanometres in this example. Each of the cavities has a cross-sectional dimension of approximately 40 nm. The total tweezer cross-sectional dimension is approximately 120 nm.

The tubular structure 1120 may be manufactured using a modified form of the fabrication technique described previously with reference to FIG. 1. In the modified technique, a four-barreled quartz capillary is used instead of a two-barreled quartz capillary. In general, a glass structure having more than two chambers may be used. A bung is placed on the proximal ends of the third and fourth cavities in order to prevent combustible gas such as butane flying into the third and fourth cavities. In this way, combustible gas is allowed to flow into the first and second cavities, but not to the third and fourth cavities. An electrode is therefore formed by combustion at the distal end of the first and second cavities, but the third and fourth cavities remain clear.

Figure 12:
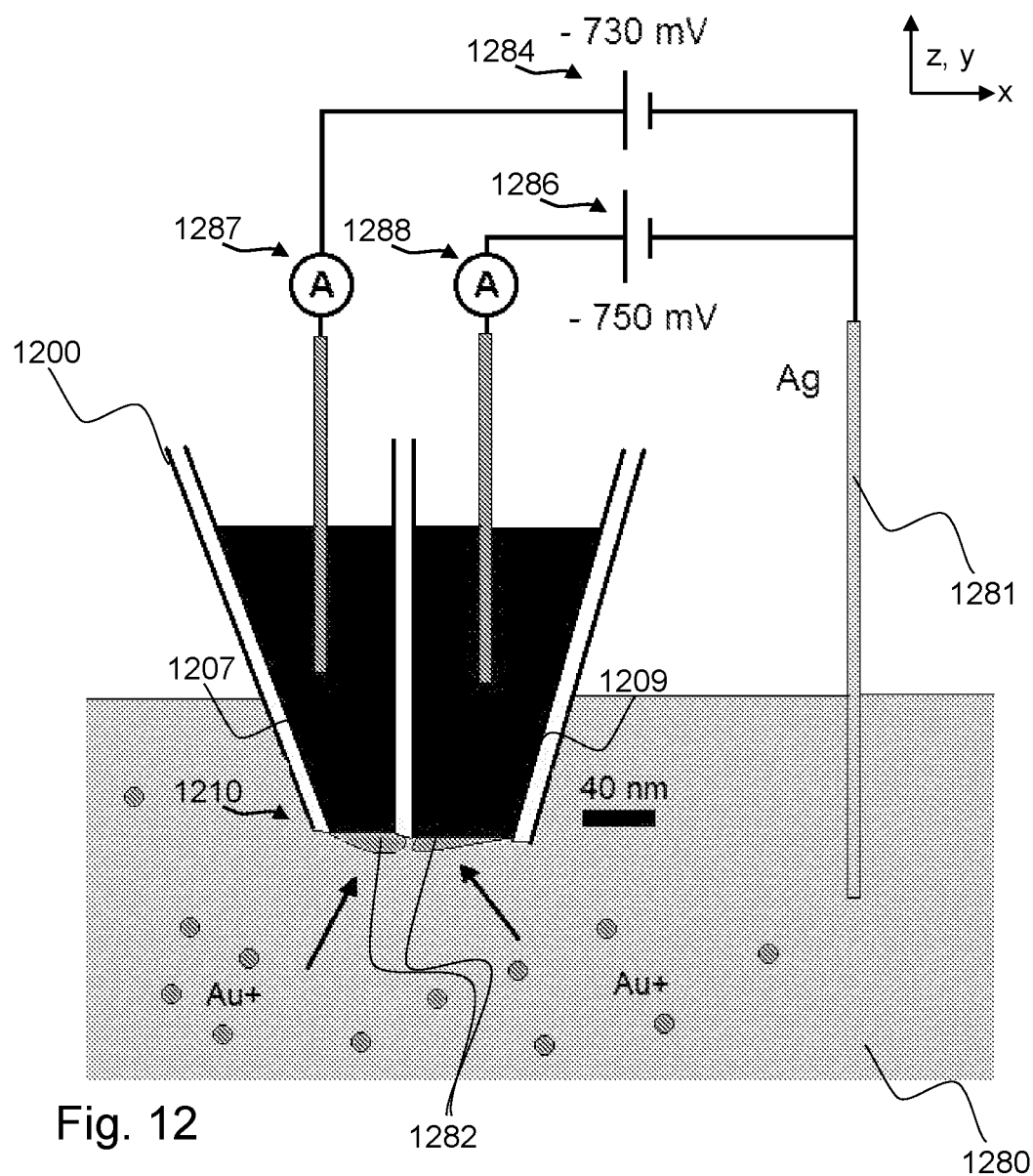
FIG. 12 illustrates a schematic arrangement for fabrication of a tunneling junction on a nanotweezer.

FIG. 12 illustrates a schematic arrangement for fabrication of a tunneling junction on a nanotweezer 1200 such as that described previously with reference to FIG. 1, 4 or 11. The previously described nanotweezers can be modified into a tunneling detector by forming a tunneling junction between the carbon electrodes 1207, 1209.

In this example, the distal end 210 of the nanotweezer 1200 is provided in a gold ion-containing solution 1280. A silver/silver chloride reference electrode 1281 is also inserted in the solution 1280. A first direct current voltage source 1284 is provided between the first electrode 1207 and the silver/silver chloride reference electrode 1281. A second direct current voltage source 1286 is provided between the second electrode 1209 and the silver/silver chloride reference electrode 1281. A first ammeter 1287 is provided between the first electrode 1207 and first direct current voltage source 1284. A second ammeter 1288 is provided between the second electrode 1209 and the second direct current voltage source 1286.

The tunneling junction is formed by electrodepositing gold 1282 onto both the first and second electrodes 1207, 1209 simultaneously with a feedback control. For this, a potential difference between the electrodes was maintained between the two electrodes and a current between the electrodes is monitored during the electrodeposition. A sharp increase in the current between the electrodes indicates the formation of a tunneling junction between the first and second electrodes of the nanotweezer. The electrodeposition is stopped in response to the formation of the tunneling junction.

Figure 13:
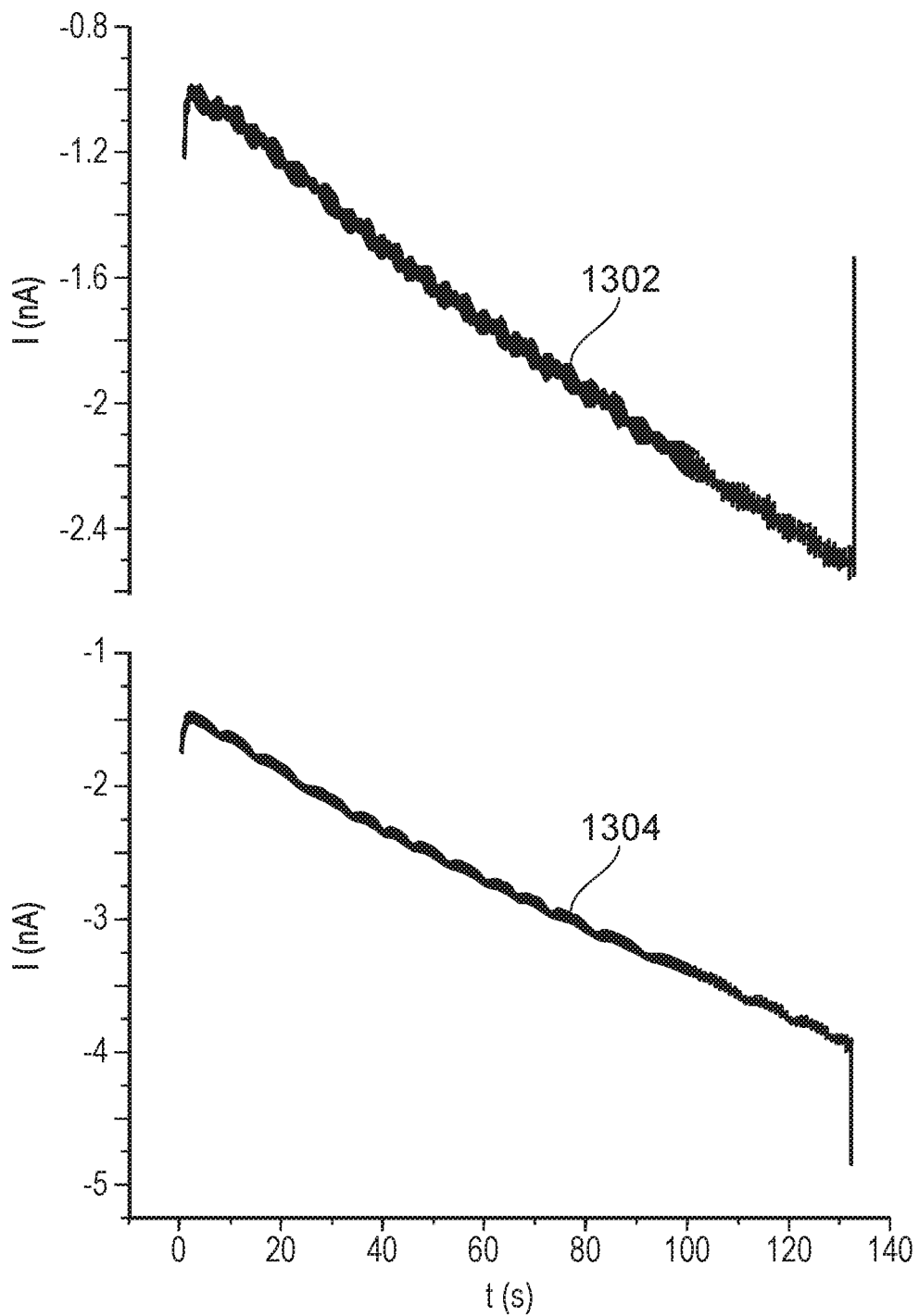
FIG. 13 illustrates current against time profiles at first and second electrodes.

FIG. 13 illustrates current against time profiles at the first electrode 1302 and at the second electrode 1304 of a nanotweezer such as that described with reference to FIG. 12. A sharp change in the current is seen after 130 seconds, at which point the electrodeposition is stopped. In this example, a threshold current of −5 nA for the second electrode current was used to determine when to stop electrodeposition.

In order to characterize the nanotweezer tunneling detector, Current-voltage (IV) curves were recoded between the electrodes in different solvents (water, DMSO, Hexane) and in air. From the IV, the width of the tunneling junction can be calculated by fitted them with the Simmons model [Simmons J. G. *J. Appl. Phys.*, 1963. 34(6): 1793-1803], a standard model for tunneling currents, using a custom-written Matlab code.

Figure 14:
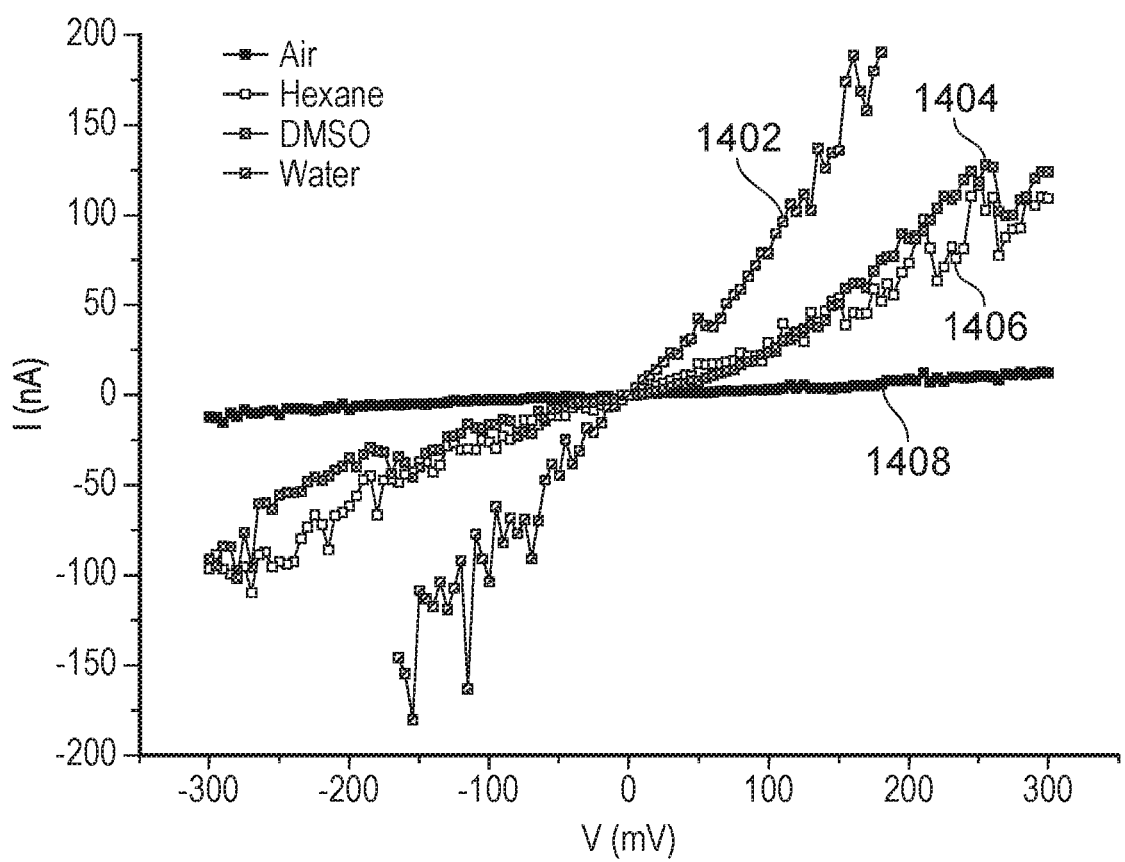
FIG. 14 illustrates current-voltage (IV) curves in different solvents recorded at a nanotweezer tunneling device.

FIG. 14 illustrates current-voltage (IV) curves in different solvents recorded at a nanotweezer tunneling device such as that described with reference to FIG. 12. Profiles are shown for water 1402, Dimethyl sulfoxide (DMSO) 1404, hexane 1406 and air 1408. The Theoretical tunneling gap width (d) calculated from the recorded IVs is provided for each medium in the table below.

| Solvent | d (nm) | Exp. barrier height (eV) | Barrier height (eV) |
|---|---|---|---|
| Air | 4.1 | 4.00 | 0.7-4.7 |
| Hexane | 3.1 | 3.51 | 3.46 |
| DMSO | 2.8 | 2.11 | 2.12 |
| Water | 3.1 | 0.93 | 0.93 |

Theoretical tunnelling gap width (d) calculated from the recorded IVs

The general principle of operation of tunneling detectors is well known, and discussed for example in Miles et al. Chem. Soc. Rev., 2013, 42, 15-28.

Figure 15:
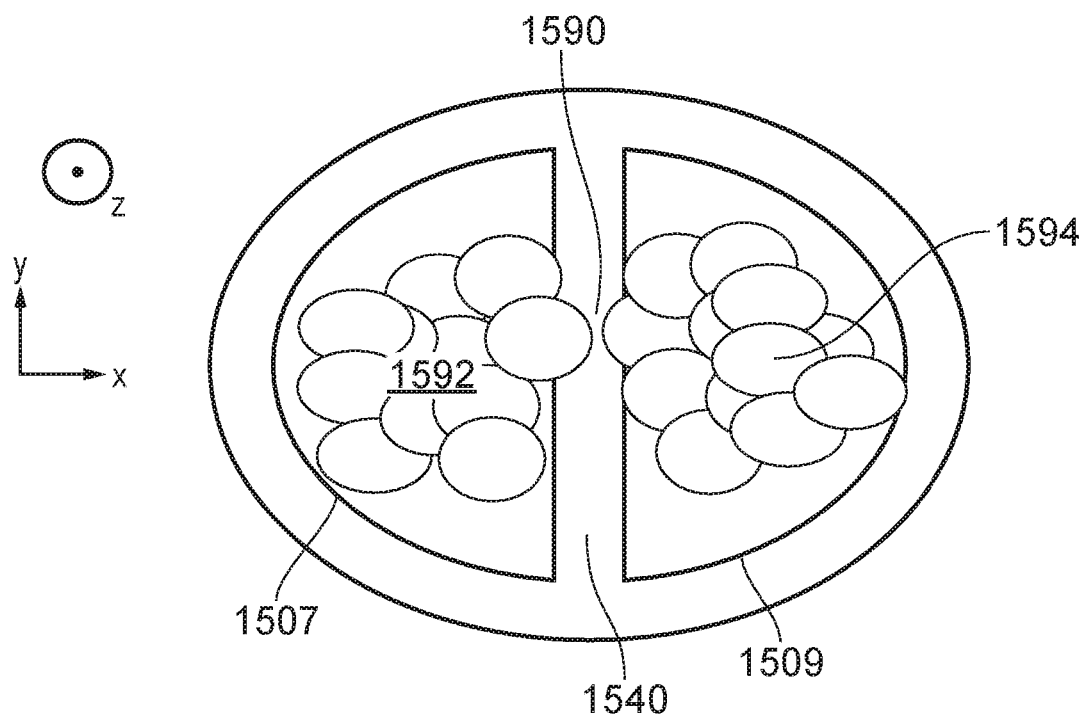
FIG. 15 illustrates a schematic view of a lateral cross-section of the distal end of a nanotweezer.

FIG. 15 illustrates a schematic view of a lateral cross-section of the distal end of a nanotweezer similar to that described previously with reference to FIG. 3a in which a tunneling junction 1590 is formed by a metallic layer with a first portion 1592 on the first electrode 1507 and a second portion 1594 on the second electrode 1509. In this example, the metal layers 1592, 1594 comprise gold nanoparticles.

An electrically insulating gap between the first and second portions provides the tunneling junction. The electrically insulating gap has a width that is narrower than a width of the electrically insulating barrier 1540.

Single molecule detection and identification may be achieved using the nanotweezer as a tunneling detector. This may be achieved by holding the nanotweezer in the analyte solution while applying a small bias between the electrodes and recording the resulting tunneling current. The analyte molecules that diffuses into the tunneling junction, causes a modulation in the tunneling current whose magnitude and duration can reveal information about the nature and properties of the molecule.

Apart from the easy fabrication and operation, nanotweezer offers the possibility of integrating dielectrophoretic trapping as a pre-concentration strategy for detection of analyte molecules from ultra-low low concentrations, with high temporal resolution. This can be achieved by first applying a sort pulse of alternating electric field between the electrodes for dielectrophoretic trapping a molecule followed by a direct current bias between the electrodes for tunneling detection.

However, features related to the tunneling junction that are described in combination with a dielectrophoretic tweezer may also be used in a more general apparatus without the pre-application of a dielectrophoretic field.

The invention claimed is:

1. A device comprising:
    a dielectrophoretic tweezer comprising:
        a first end and a second end, in which the first end has a lateral dimension of less than 10 microns;
        a structure, extending in a longitudinal direction between the first and second ends, comprising an electrically insulating barrier defining a first chamber and a second chamber within the structure, in which the first and second chambers are insulated from each other by the electrically insulating barrier;
        a first electrode in the first chamber at the first end; and
        a second electrode in the second chamber at the first end,
        in which a width of the electrically insulating barrier separating the first electrode from the second electrode is 50 nm or less; and
    a signal generator configured to provide a time-varying voltage across the first and second electrodes of the dielectrophoretic tweezer to create a dielectrophoretic field at the first end of the dielectrophoretic tweezer.

2. The dielectrophoretic tweezer of claim 1, in which a width of the electrically insulating barrier separating the first electrode from the second electrode is 30 nm or less.

3. The dielectrophoretic tweezer of claim 1, in which the first electrode has a lateral dimension of 50 nm or less and in which the second electrode has a lateral dimension of 50 nm or less.

4. The dielectrophoretic tweezer of claim 1, in which the structure has a lateral dimension of 100 nm or less at the first end.

5. The dielectrophoretic tweezer of claim 1, in which the first and second electrodes comprise conductive carbon.

6. The dielectrophoretic tweezer of claim 1, comprising a metallic layer on part of the electrically insulating barrier at the first end, in which the metallic layer comprises:
    a first portion that extends at least partially over the first electrode;
    a second portion that extends at least partially over the second electrode;
    and
    an electrically insulating gap between the first and second portions, the
    electrically insulating gap having a width that is narrower than a width of the electrically insulating barrier.

7. The dielectrophoretic tweezer of claim 6, in which the metallic layer is formed of a different material to the first and second electrodes and optionally comprises metal nanoparticles.

8. The dielectrophoretic tweezer of claim 6, in which the electrically insulating gap has a width of 10 nm or less.

9. The dielectrophoretic tweezer of claim 1, in which the first electrode and second electrode each define a semi-elliptical surface at the first end.

10. The dielectrophoretie tweezer of claim 1, in which the first electrode and second electrode each have a non-coterminous edge region at the first end and a coterminous edge region at the first end.

11. The dielectrophoretic tweezer of claim 1, in which the structure comprises a third chamber, in which the third chamber has openings at the first and second ends of the structure and provides a channel between the first end and the second end, and in which the third chamber is defined by the structure and is insulated and isolated from other chambers within the structure by the electrically insulating barrier.

12. The dielectrophoretic tweezer of claim 11 in which a third electrode is provided within the third chamber.

13. The dielectrophoretic tweezer of claim 11, in which the structure comprises a fourth chamber, in which the fourth chamber has openings at the first and second ends of the structure and provides a channel between the first end and the second end, and in which the fourth chamber is defined by the electrically insulating barrier and the structure and is insulated and isolated from other chambers within the structure by the electrically insulating barrier.

14. A cell biopsy apparatus comprising:
the dielectrophoretic tweezer of claim 1;
a microscope having a stage for holding a sample; and
an actuator configured to actuate movement of the dielectrophoretic tweezer with respect to the stage.

15. The cell biopsy apparatus of claim 14, in which the structure of the dielectrophoretic tweezer comprises a third chamber, in which the third chamber has openings at the first and second ends of the structure and provides a channel between the first end and the second end, and in which the third chamber is defined by the structure and is insulated and isolated from other chambers within the structure by the electrically insulating barrier;
a third electrode is provided within the third chamber; and
the microscope comprises a scanning ion-conductance microscope comprising:
a holder for holding the dielectrophoretic tweezer;
a scanning ion-conductance microscopy monitoring circuit having terminals configured to measure a current between the third electrode of the dielectrophoretic tweezer and another electrode; and
a signal generator configured to provide a time-varying voltage to the first and second electrodes of the dielectrophoretic tweezer.

16. The cell biopsy apparatus of claim 15, comprising a controller configured to operate the scanning ion-conductance microscopy monitoring circuit during a different time period to the signal generator.

17. A method of forming a dielectrophoretic tweezer, the method comprising:
receiving a structure comprising a first end, a second end and an electrically insulating barrier, in which a first chamber and a second chamber are defined within the structure and are insulated from each other by the electrically insulating barrier, and in which a third chamber is defined by the structure and is insulated and isolated from the first chamber and the second chamber within the structure by the electrically insulating barrier, said third chamber having openings at the first end and second end of the structure and providing a channel between the first end and the second end;
pulling the structure to form a lateral dimension of less than 10 micron at the first end of the structure and a width of the electrically insulating barrier separating the first chamber from the second chamber of 50 nm or less;
depositing a conductive material to form a first electrode in the first chamber by at the first end of the structure; and
depositing a conductive material to form a second electrode in the second chamber by depositing a conductive material at the first end of the structure.

18. The method of claim 17, inserting metal wires through respective openings at the second end until the respective metal wires contact the first and second carbon electrode at the first end.

19. A method of operating the dielectrophoretic tweezer, the dielectrophoretic tweezer comprising:
a first end and a second end, in which the first end has a lateral dimension of less than 10 microns:
a structure, extending in a longitudinal direction between the first and second ends, comprising an electrically insulating barrier defining a first chamber and a second chamber within the structure, in which the first and second chambers are insulated from each other by the electrically insulating barrier;
a first electrode in the first chamber at the first end; and a second electrode in the second chamber at the first end,
in which a width of the electrically insulating harrier separating the first electrode from the second electrode is 50 nm or less, the method comprising:
bringing the first end of the dielectrophoretic tweezer into the proximity of a molecule of interest;
applying a time-varing voltage across the first and second electrodes of the dielectrophoretic tweezer to create a dielectrophoretic field at the first end of the dielectrophoretic tweezer;
attracting the molecule of interest to the first and second electrodes using, the dielectrophoretic field; and
releasing the molecule of interest.

20. The method of claim 19 in which the structure is composed of four chambers isolated and insulated from each other, of which two diagonally opposite chambers have openings at each of the first and second ends and each provide a channel between the first end and second end, and the other two diagonally opposite chambers have carbon deposited inside the first end to from two carbon electrodes separated by an insulating barriers with width of 50 nm or less.

* * * * *